United States Patent [19]

Modegi

[11] Patent Number: 5,784,200
[45] Date of Patent: Jul. 21, 1998

[54] DIFRACTION GRATING RECORDING MEDIUM, AND METHOD AND APPARATUS FOR PREPARING THE SAME

[75] Inventor: Toshio Modegi, Tokyo, Japan

[73] Assignee: Dai Nippon Printing Co., Ltd., Tokyo, Japan

[21] Appl. No.: 784,724

[22] Filed: Jan. 16, 1997

Related U.S. Application Data

[63] Continuation of Ser. No. 248,339, May 24, 1994, abandoned.

[30] Foreign Application Priority Data

| May 27, 1993 | [JP] | Japan | 5-148680 |
| May 27, 1993 | [JP] | Japan | 5-148681 |
| Nov. 24, 1993 | [JP] | Japan | 5-317274 |

[51] Int. Cl.$^6$ ............... G02B 5/18; G03H 1/00
[52] U.S. Cl. ............... 359/567; 359/569; 359/2
[58] Field of Search ............... 359/9, 566, 567, 359/568, 569, 570, 572, 573, 2; 428/620

[56] References Cited

U.S. PATENT DOCUMENTS

| 4,568,141 | 2/1986 | Antes | 359/2 |
| 4,604,329 | 8/1986 | Reber | 428/620 |
| 5,032,003 | 7/1991 | Antes | 359/567 |
| 5,301,062 | 4/1994 | Takahashi et al. | 359/567 |
| 5,335,113 | 8/1994 | Jackson et al. | 359/569 |

*Primary Examiner*—James Phan
*Assistant Examiner*—Audrey Chang
*Attorney, Agent, or Firm*—Ladas & Parry

[57] ABSTRACT

A hologram seal for security is prepared in pseudo manner by using a diffraction grating pattern. A picture data of a plurality of motifs is inputted to a computer. Within the computer, there are prepared in advance plural kinds of pixel patterns in which grating lines are arranged within one pixel at a predetermined line width, a pitch and an arrangement angle. These pixel patterns are arranged in a matrix form like tiles by making reference to the inputted picture data to represent respective motifs. The picture data in which the motifs are represented is given to an electron beam picture drawing apparatus to prepare a diffraction grating original block. This original block is used to mass-produce pseudo hologram seals by press device. By varying an arrangement angle of grating lines, it is possible to carry out gradation representation, or to record a plurality of motifs in an overlapping manner.

8 Claims, 31 Drawing Sheets

PIXEL PATTERNS

Fig.1a
MOTIF
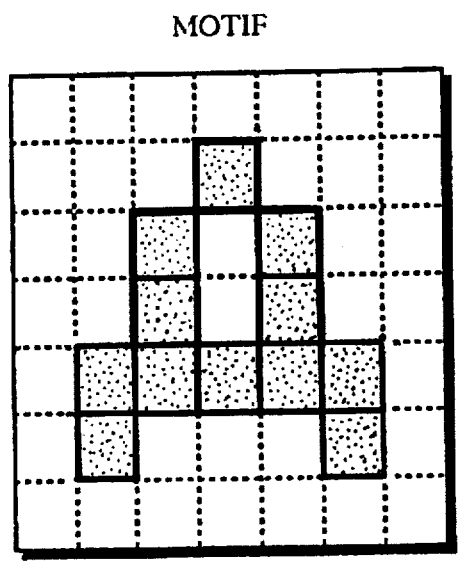
Fig.1b
MOTIF PIXEL INFORMATION
| 0 | 0 | 0 | 0 | 0 | 0 | 0 |
|---|---|---|---|---|---|---|
| 0 | 0 | 0 | 1 | 0 | 0 | 0 |
| 0 | 0 | 1 | 0 | 1 | 0 | 0 |
| 0 | 0 | 1 | 0 | 1 | 0 | 0 |
| 0 | 1 | 1 | 1 | 1 | 1 | 0 |
| 0 | 1 | 0 | 0 | 0 | 1 | 0 |
| 0 | 0 | 0 | 0 | 0 | 0 | 0 |
Fig.2
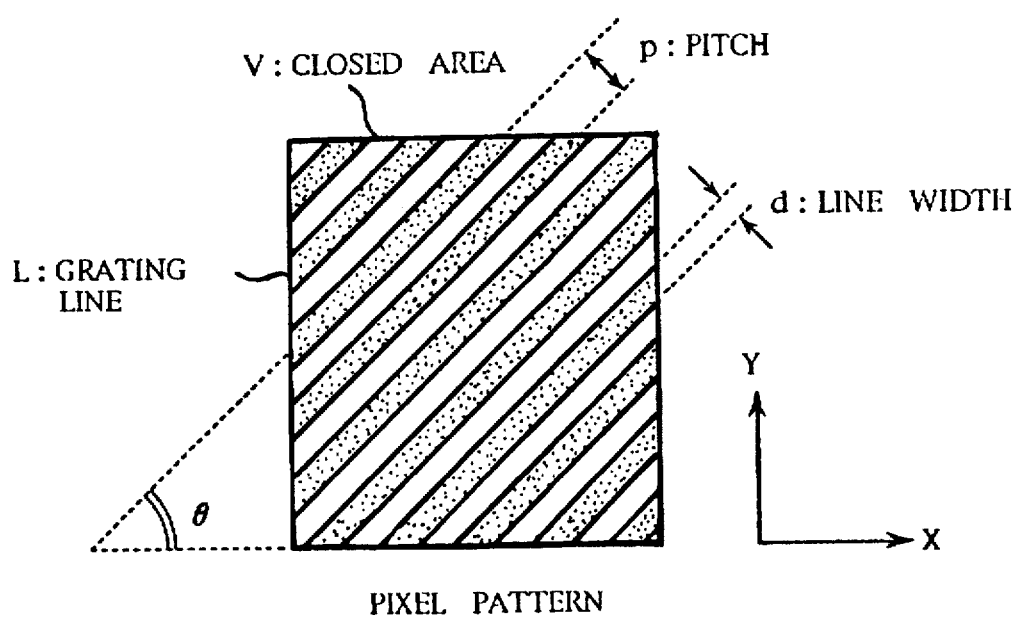
PIXEL PATTERN

DIFFRACTION GRATING RECORDING MEDIUM

PIXEL PATTERN

PIXEL PATTERNS

| P1 | P2 | P3 | P4 | P5 |
| --- | --- | --- | --- | --- |
| 30° | 60° | 90° | 120° (−60°) | 150° (−30°) |

CORRESPONDENCE RELATIONSHIP INFORMATION

|  |  |  |  |  |  |  |
|---|---|---|---|---|---|---|
|  |  |  | P3 |  |  |  |
|  |  | P2 |  | P4 |  |  |
|  |  | P2 |  | P4 |  |  |
|  | P1 | P2 | P3 | P4 | P5 |  |
|  | P1 |  |  |  | P5 |  |
|  |  |  |  |  |  |  |

CORRESPONDENCE RELATIONSHIP INFORMATION

|  |  |  |  |  |  |  |
|---|---|---|---|---|---|---|
|  |  |  | 90 |  |  |  |
|  |  | 60 |  | 120 |  |  |
|  |  | 60 |  | 120 |  |  |
|  | 30 | 60 | 90 | 120 | 150 |  |
|  | 30 |  |  |  | 150 |  |
|  |  |  |  |  |  |  |

MOTIF

INITIAL VALUE 30°     END VALUE 150°

MOTIF PIXEL INFORMATION

| 0 | 0 | 0 | 0 | 0 | 0 | 0 |
|---|---|---|---|---|---|---|
| 0 | 0 | 0 | 180 | 0 | 0 | 0 |
| 0 | 0 | 110 | 0 | 210 | 0 | 0 |
| 0 | 0 | 110 | 0 | 210 | 0 | 0 |
| 0 | 60 | 110 | 180 | 210 | 255 | 0 |
| 0 | 60 | 0 | 0 | 0 | 255 | 0 |
| 0 | 0 | 0 | 0 | 0 | 0 | 0 |

Fig. 9a
MOTIF A
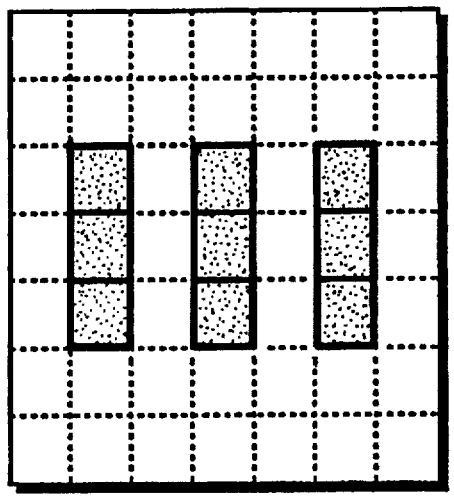
Fig. 9b
MOTIF B
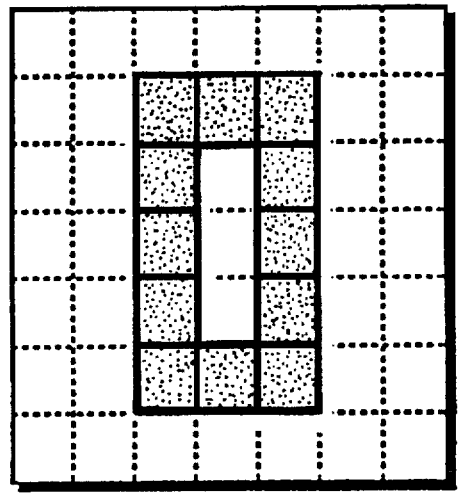
Fig. 10
PIXEL PATTERNS
P1
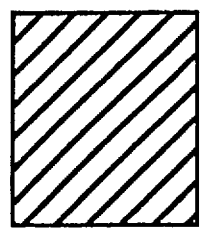
45°
P2
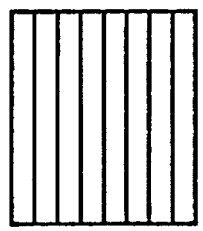
90°

CORRESPONDENCE RELATIONSHIP
INFORMATION R1

|   |   |   |   |   |   |
|---|---|---|---|---|---|
|   |   |   |   |   |   |
|   | P1 | P1 | P1 |   |   |
|   | P1 | P1 | P1 |   |   |
|   | P1 | P1 | P1 |   |   |
|   |   |   |   |   |   |

CORRESPONDENCE RELATIONSHIP
INFORMATION R2

|   |   |   |   |   |   |
|---|---|---|---|---|---|
|   |   | P2 | P2 | P2 |   |
|   |   | P2 |    | P2 |   |
|   |   | P2 |    | P2 |   |
|   |   | P2 |    | P2 |   |
|   |   | P2 | P2 | P2 |   |

DIFFRACTION GRATING
RECORDING MEDIUM

PIXEL PATTERNS

CORRESPONDENCE RELATIONSHIP INFORMATION R1

CORRESPONDENCE RELATIONSHIP INFORMATION R2

MOTIF A

MOTIF B

CORRESPONDENCE RELATIONSHIP INFORMATION R1

CORRESPONDENCE RELATIONSHIP INFORMATION R2

ARRANGEMENT OF
"UNIT SUB-PIXEL ARRANGEMENTS"

SUB-PIXEL ARRANGEMENT

ARRANGEMENT OF
"UNIT SUB-PIXEL ARRANGEMENTS"

PIXEL PATTERN ARRANGEMENT
FOR SUB-PIXEL
(MOTIF A)

PIXEL PATTERN ARRANGEMENT
FOR SUB-PIXEL
(MOTIF B)

DIFFRACTION GRATING
RECORDING MEDIUM fig.23a

SUB-PIXEL
CONSTITUTIVE
INFORMATION

| A | B |
|---|---|
| C | D | fig.23b

SUB-PIXEL
CONSTITUTIVE
INFORMATION

| A | B |
|---|---|
| C | C | fig.23c

SUB-PIXEL
CONSTITUTIVE
INFORMATION

| A | B |
|---|---|
| B | A+C | fig.24a

SUB-PIXEL CONSTITUTIVE
INFORMATION

| A | B | C |
|---|---|---|
| C | A | B |
| B | C | A | fig.24b

SUB-PIXEL CONSTITUTIVE
INFORMATION

| A | B | C |
|---|---|---|
| B | C | A |
| C | A | B |

Fig. 25

MOTIF A

N-COLUMNS

M-ROWS

| A11 | A12 | A13 | A14 | A15 |
|-----|-----|-----|-----|-----|
| A21 | A22 | A23 | A24 | A25 |
| A31 | A32 | A33 | A34 | A35 |
| A41 | A42 | A43 | A44 | A45 |

Fig. 26

MOTIF B

N-COLUMNS

M-ROWS

| B11 | B12 | B13 | B14 | B15 |
|-----|-----|-----|-----|-----|
| B21 | B22 | B23 | B24 | B25 |
| B31 | B32 | B33 | B34 | B35 |
| B41 | B42 | B43 | B44 | B45 |

(A,B LABELED INSIDE INDICATE SUB-PIXEL CONSTITUTIVE INFORMATION)

(A,B LABELED INSIDE INDICATE SUB-PIXEL CONSTITUTIVE INFORMATION)

DIFFRACTION GRATING RECORDING MEDIUM

Z1　Z2　Z3　Z4　Z5　Z6　Z7

GRATING LINE ANGULAR DISTRIBUTION OF MOTIF A

Z1　Z2　Z3　Z4　Z5　Z6　Z7
　　35°　40°　45°　50°　55°

Fig. 31a
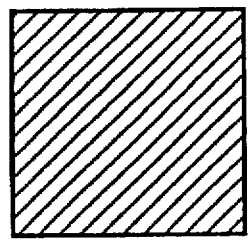
Fig. 31b
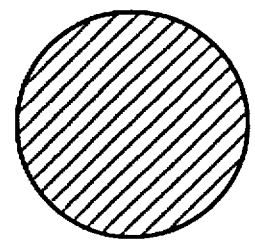
Fig. 32
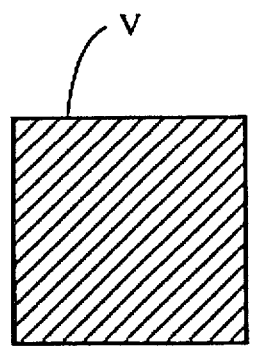
100%
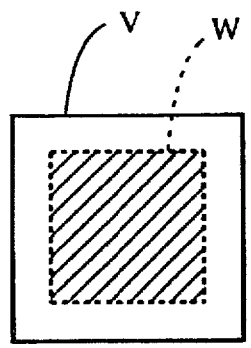
50%
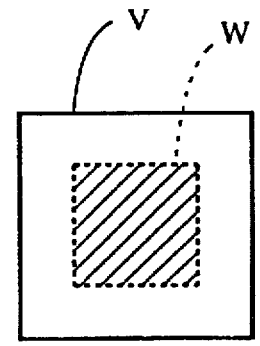
30%
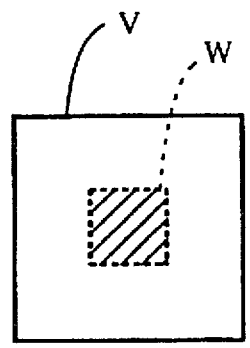
10%
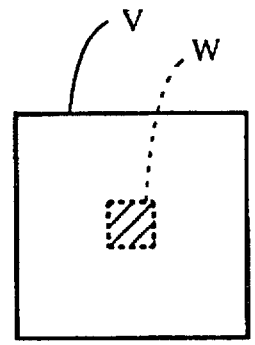
5%
PIXEL PATTERNS HAVING
DIFFERENT DENSITY VALUES

Fig.33a
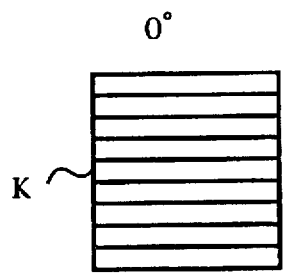
0°
Fig.33b
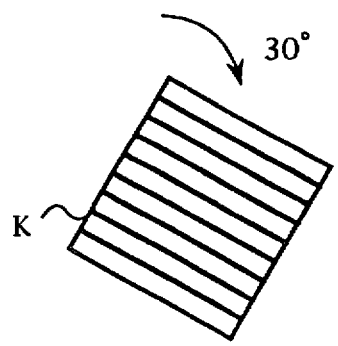
30°
Fig.33c
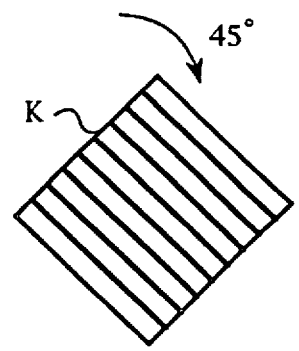
45°
Fig.33d
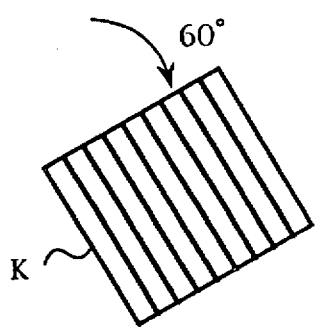
60°
Fig.33e
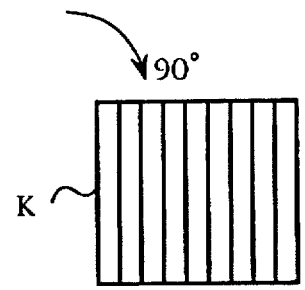
90°
Fig.34
PIXEL PATTERNS
| P1 | P2 | P3 | P4 | P5 |
|---|---|---|---|---|
| 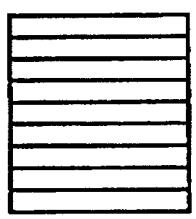 | 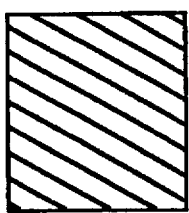 | 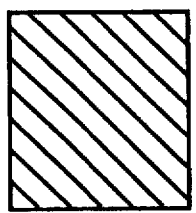 | 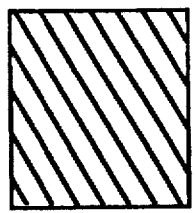 | 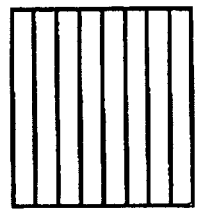 |
| 0° | 30° | 45° | 60° | 90° |
| $0 \leq C < 20$ | $20 \leq C < 40$ | $40 \leq C < 60$ | $60 \leq C < 80$ | $80 \leq C \leq 100$ | fig.35a
| 5 | 5 | 5 | 5 | 5 | 5 | 5 |
|---|---|---|---|---|---|---|
| 5 | 5 | 5 | 95 | 5 | 5 | 5 |
| 5 | 5 | 90 | 5 | 90 | 5 | 5 |
| 5 | 5 | 70 | 5 | 70 | 5 | 5 |
| 5 | 35 | 35 | 35 | 35 | 35 | 5 |
| 5 | 30 | 5 | 5 | 5 | 30 | 5 |
| 5 | 5 | 5 | 5 | 5 | 5 | 5 |
fig.35b
| P1 | P1 | P1 | P1 | P1 | P1 | P1 |
|----|----|----|----|----|----|----|
| P1 | P1 | P1 | P5 | P1 | P1 | P1 |
| P1 | P1 | P5 | P1 | P5 | P1 | P1 |
| P1 | P1 | P4 | P1 | P4 | P1 | P1 |
| P1 | P2 | P2 | P2 | P2 | P2 | P1 |
| P1 | P2 | P1 | P1 | P1 | P2 | P1 |
| P1 | P1 | P1 | P1 | P1 | P1 | P1 |
fig.36a
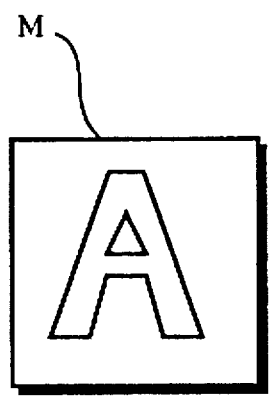
fig.36b
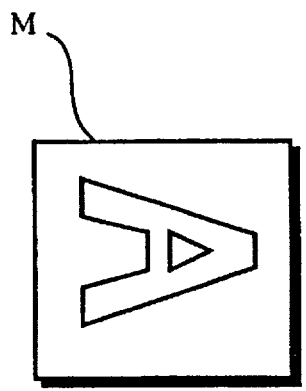

𝔉ig.39

| CLOSED AREA | I<br>INSIDE L1 | II<br>L1~L2 | III<br>L2~L3 | IV<br>L3~L4 | V<br>L4~L5 |
|---|---|---|---|---|---|
| LINE WIDTH | 0.6 | 0.6 | 0.6 | 0.6 | 0.6 |
| PITCH | 1.2 | 1.2 | 1.2 | 1.2 | 1.2 |
| ARRENGEMENT ANGLE | 0° | 10° | 20° | 30° | 40° |

| CLOSED AREA | I | II | III | IV | V | VI | VII | VIII | IX |
|---|---|---|---|---|---|---|---|---|---|
| ARRENGEMENT ANGLE | −30° | −15° | 0° | 15° | 30° | 15° | 0° | −15° | −30° |

5,784,200

DIFRACTION GRATING RECORDING MEDIUM, AND METHOD AND APPARATUS FOR PREPARING THE SAME

This application is a continuation of application Ser. No. 08/248,339, filed on May 24, 1994, was abandoned.

BACKGROUND OF THE INVENTION

This invention relates to a diffraction grating recording medium, and a method and an apparatus for preparing the same, and more particularly to a diffraction grating recording medium, and a method and an apparatus for preparing the same, which are suitable for utilization of a hologram seal for security for verifying a true article.

As means for preventing forgery of a credit card, a deposit bankbook, or a gold note, etc., hologram seals are utilized. Further, also with respect to goods such as video tapes or higher grade wrist watches, etc., in order to prevent pirated version from coming to the market, hologram seals are utilized. In addition, hologram seals are utilized also for the purpose of decoration or sales promotion. There are many instances where, for such hologram seals, a two-dimensional pattern is used as a motif in place of a three-dimensional image.

In order to prepare such hologram seals, an optical hologram photographing method for forming interference fringe by using laser beam is ordinarily used. Namely, a manuscript on which a two-dimensional pattern motif is depicted is prepared. Then a laser beam is branched into two components and one branched beam is irradiated on the manuscript to allow a reflected light beam thereof. The other branched beam and the reflected light beam are interfered with each other to record an interference fringe thereof onto a photosensitive material. When a hologram original block is prepared in this way, by using this original block, it is possible to mass-produce hologram seals by the technique of press.

However, the above-described conventional optical hologram photographing method has the problem that no clear hologram image can be obtained. Namely, since an interference fringe optically formed is sensitive to vibration, it is necessary to carry out hologram photographing in the environment where such vibration is completely excluded. However, even if an anti-vibration pedestal of considerably higher accuracy is used to carry out photographing, it is difficult to completely exclude vibration. For this reason, so called "fogging (obscurity of pictorial image)" takes place in recording image of an interference fringe, thus failing to provide a bright hologram image having contrast. Further, since there are some fluctuations in wavelength of laser beams used, noise in cloud glass form cannot be avoided. As stated above, since there is the problem that reproducibility is poor in optical hologram photographing, it also becomes difficult to prepare the same several original blocks.

SUMMARY OF THE INVENTION

With the above in view, one object of this invention is to provide a medium on which a hologram image or pseudo-hologram image having clear or distinct reproducibility is recorded, and another object of this invention is to provide a method and an apparatus for preparing such a medium.

To achieve the above-described objects, this invention employs two approaches. The feature of the first approach resides in that pixels in which diffraction gratings are formed are two-dimensionally arranged to thereby record a hologram pattern in a pseudo-manner. When a method of forming array of pixels is employed in this way, it is possible to prepare an arbitrary motif picture by computer. Further, it is also possible to prepare, by computer, a picture pattern of diffraction gratings formed in respective pixels and it is possible to process by computer all the work up to the final pseudo-hologram pattern preparation. In short, in accordance with this approach, preparation of diffraction grating recording medium can be made based on diffraction grating pattern data generated by computer without carrying out optical photographing. When diffraction grating pattern data once prepared are preserved, to carry out work for preparing diffraction grating recording medium, for a second time on the basis of this preserved data, substantially the same recording medium can be obtained and substantially perfect reproducibility can be obtained. In this case, because there is no necessity of carrying out optical photographing, a clear pseudo-hologram image can be obtained.

It should be noted that the term "hologram" is generally used as the term indicating an image obtained by interference fringes. In such a sense, an image prepared on a recording medium of this invention is not called "hologram", but should be called "diffraction grating pattern". However, since recording media used as a seal for prevention of forgery is generally called "hologram seal", the term "pseudo-hologram" is used in connection with "diffraction grating pattern" formed on a recording medium in the specification of this application.

As stated above, in accordance with the first approach, since pixels in which diffraction gratings are formed are arranged to form a desired motif, it is possible to utilize various special effects. For example, by varying line width, pitch and arrangement angle of grating lines constituting diffraction grating, it is possible to prepare diffraction gratings having different optical characteristics. In view of this, if a plurality of elements having different optical characteristics as stated above are prepared to properly use them in a suitable manner, various special effects can be represented. In more practical sense, if there is employed a method such that, with respect to the first motif, first pixels are arranged to represent it, and with respect to the second motif, second pixels are arranged to represent it, it becomes possible to record these two motifs on the same plane and to independently recognize them, because of differences in optical characteristics between the first pixels and the second pixels.

As described above, in accordance with the first approach of this invention, by two-dimensionally disposing pixels in which diffraction gratings are formed, a pseudo-hologram pattern can be recorded. The inventor of this application has drawn attention to the phenomenon that brightness of a pixel, in which diffraction gratings are formed, varies by grating line arrangement angle of diffraction grating, when the pixel is visually observed. Namely, the inventor took notice of the fact that half-tone motif can be represented by substituting arrangement angle of grating lines for density value of pixel. In view of this, if an approach is employed to prepare plural kinds of pixel patterns having different brightnesses in dependency upon difference of grating line arrangement angle and to successively replace individual pixels constituting motif by the prepared pixel patterns having brightnesses corresponding to their density values, it is possible to realize a diffraction grating recording medium in which half-tone motif is represented.

Ordinarily, the above-described process is carried out by computer. At this time, if an approach is employed to selectively display only a predetermined pixel pattern having a certain arrangement angle of grating lines, an operator will make it possible to carry out pattern confirmation to determine whether or not a correct motif is represented on a display screen with a higher degree of freedom.

On the other hand, the feature of the second approach of this invention resides in that a diffraction grating pattern is generated by computer, in place of conventional optical hologram photographing method, and the generated pattern is recorded as a pseudo-hologram pattern into a predetermined closed area on a medium. Namely, contour line data is first prepared, in which picture pattern having a plurality of closed areas is represented by contour lines of respective closed area. Subsequently, setting of grating condition is carried out with respect to these respective closed areas. In more practical sense, a line width, a pitch and an arrangement angle of grating lines constituting diffraction grating are set every respective closed areas as the grating condition. What grating condition is set is dependent upon instructions of an operator, and it is possible to freely set different grating conditions every respective closed areas. The grating conditions thus set are outputted in the form of grating data. If contour line data and grating data can be prepared in this way, grating pattern can be generated on the basis of these data. This grating pattern is composed of diffraction gratings generated under a predetermined grating condition every respective closed areas. Finally, this grating pattern is formed on a physical medium. In this way, diffraction grating pattern having a predetermined picture as a motif is generated on the medium. Since gratings are formed under different conditions every closed areas, diffraction effects different every respective closed area obtained, thus making it possible to recognize motif of the original picture.

Also in the second approach, preparation of pseudo-hologram can be made by diffraction grating pattern generated by computer without carrying out optical photographing. If contour line data and grating data prepared once are preserved to carry out work for preparing medium, for a second time, exactly the same medium can be obtained on the basis of these data. Thus, substantially perfect reproducibility is obtained. In addition, since there is no necessity of carrying out optical photographing, a clear pseudo-hologram image is obtained.

Summary of this invention will now be described every individual features. Among these features, the first to twenty fourth features are based on the above-described first approach, and the twenty fifth to the thirty first features are based on the above-described second approach.

(1) The first feature of the present invention resides in a diffraction grating recording medium in which a motif is represented by diffraction gratings,
characterized in that a plurality of pixel patterns in which grating lines of a predetermined width are arranged within a predetermined closed area at a predetermined pitch and at a predetermined angle are defined by varying at least one of three parameters of line width, pitch and angle and these plurality of pixel patterns are arranged on a plane of a medium to thereby represent the motif.

(2) The second feature of the present invention resides in a diffraction grating recording medium according to the first feature,
wherein different pixel patterns are used for different motifs respectively to thereby represent a plurality of motifs on a same plane in an overlapping manner.

(3) The third feature of the present invention resides in a diffraction grating recording medium according to the first feature,
wherein plural groups of pixel patterns are defined, each group being comprised of a plurality of pixel patterns having parameters similar to each other, and pixel patterns belonging to different groups are used for different motifs respectively to thereby represent a plurality of motifs on a same plane in an overlapping manner.

(4) The fourth feature of the present invention resides in a diffraction grating recording medium according to the third feature,
wherein a motif is divided into a plurality of areas and same pixel patterns having same parameters are arranged within a same area.

(5) The fifth feature of the present invention resides in a diffraction grating recording medium according to the second feature,
wherein unit sub-pixel arrangements comprised of sub-pixels arranged in a matrix of 2 rows by 2 columns are arranged lengthwise and breadthwise; pixel patterns for representing a first motif are arranged at left upper sub-pixels and right lower sub-pixels in the respective unit sub-pixel arrangements; and pixel patterns for representing a second motif are arranged at left lower sub-pixels and right upper sub-pixels in the respective unit sub-pixel arrangements, thus to represent two motifs on a same plane in an overlapping manner.

(6) The sixth feature of the present invention resides in a diffraction grating recording medium according to the second feature,
wherein unit sub-pixel arrangements comprised of sub-pixels arranged in a matrix of 2 rows by 2 columns are arranged lengthwise and breadthwise; pixel patterns for representing a first motif are arranged at left upper sub-pixels in the respective unit sub-pixel arrangements; pixel patterns for representing a second motif are arranged at right upper sub-pixels in the respective unit sub-pixel arrangements; pixel patterns for representing a third motif are arranged at left lower sub-pixels in the respective unit sub-pixel arrangements; and pixel patterns for representing a fourth motif are arranged at right lower sub-pixels in the respective unit sub-pixel arrangements, thus to represent four motifs on a same plane in an overlapping manner.

(7) The seventh feature of the present invention resides in a diffraction grating recording medium according to the second feature,
wherein unit sub-pixel arrangements comprised of sub-pixels arranged in a matrix of 3 rows by 3 columns are arranged lengthwise and breadthwise; pixel patterns for representing a first motif are arranged at sub-pixels of a first row and a first column, sub-pixels of a second row and a second column, and sub-pixels of a third row and a third column in the respective unit sub-pixel arrangements; pixel patterns for representing a second motif are arranged at sub-pixels of the first row and the second column, sub-pixels of the second row and the third column, and sub-pixels of the third row and the first column in the respective unit sub-pixel arrangements; and pixel patterns for representing a third motif are arranged at sub-pixels of the first row and the third column, sub-pixels of the second row and the first column, and sub-pixels of the third row and the second column in the respective unit sub-pixel arrangements, thus to represent three motifs on a same plane in an overlapping manner.

(8) The eighth feature of the present invention resides in a diffraction grating recording medium according to the second feature, wherein unit sub-pixel arrangements comprised of sub-pixels arranged in a matrix of 3 rows by 3 columns are arranged lengthwise and breadthwise; pixel patterns for representing a first motif are arranged at sub-pixels of a first row and a first column, sub-pixels of a second row and a third column, and sub-pixels of a third row and a second column in the respective unit sub-pixel arrangements; pixel patterns for representing a second motif are arranged at sub-pixels of the first row and the second column, sub-pixels of the second row and the first column, and sub-pixels of the third row and the third column in the respective unit sub-pixel arrangements; and pixel patterns for representing a third motif are arranged at sub-pixels of the first row and the third column, sub-pixels of the second row and the second column, and sub-pixels of the third row and the first column in the respective unit sub-pixel arrangements, thus to represent three motifs on a same plane in an overlapping manner.

(9) The ninth feature of the present invention resides in a diffraction grating recording medium according to the first feature, wherein a plurality of pixel patterns are prepared, the pixel patterns having different ratios, each other, of a closed area where grating lines are to be disposed to a full occupation area as a pixel, and the pixel patterns are arranged on a plane to thereby represent a half-tone motif.

(10) The tenth feature of the present invention resides in a method of preparing a diffraction grating recording medium in which a motif is represented by diffraction gratings, the method comprising:

a stage for preparing a pixel pattern in which grating lines of a predetermined width are arranged within a predetermined closed area at a predetermined pitch and at a predetermined angle;

a stage for preparing motif pixel information in which the motif is represented by defining a plurality of pixels respectively having a predetermined pixel value at predetermined positions on a plane; and a stage for making a pixel pattern correspond to a pixel on the basis of a corresponding pixel value defined in the motif pixel information, thus to arrange corresponding pixel patterns at respective pixel positions.

(11) The eleventh feature of the present invention resides in a method of preparing a diffraction grating recording medium in which a motif is represented by diffraction gratings, the method comprising:

a first stage for preparing a plurality of pixel patterns in which grating lines of a predetermined width are arranged within a predetermined closed area at a predetermined pitch and at a predetermined angle, wherein at least one of three parameters of line width, pitch and angle is varied for the respective pixel patterns;

a second stage for preparing motif pixel information in which a motif is represented by defining a plurality of pixels respectively having a predetermined pixel value at predetermined positions on a plane; and a third stage for defining a correspondence relationship between respective pixels defined in the motif pixel information and respective pixel patterns prepared at the first stage by making reference to pixel values with respect to respective pixels; and a fourth stage for disposing a pixel pattern at a predetermined pixel position on the basis of the correspondence relationship.

(12) The twelfth feature of the present invention resides in a method of preparing a diffraction grating recording medium according to the eleventh feature, wherein a plural sets of motif pixel information are respectively prepared with respect to plural different motifs at the second stage, and wherein different pixel patterns are caused to correspond to pixels belonging to different motifs at the third stage, thus to represent a plurality of motifs on a same plane in an overlapping manner.

(13) The thirteenth feature of the present invention resides in a method of preparing a diffraction grating recording medium according to the eleventh feature, wherein, at the first stage, plural groups of pixel patterns are prepared, each group being comprised of a plurality of pixel patterns having parameters similar to each other, wherein, at the second stage, a plural sets of motif pixel information are respectively prepared with respect to plural different motifs, and wherein, at the third stage, with respect to pixels belonging to different motifs, pixel patterns belonging to different groups are caused to correspond thereto, thus to represent a plurality of motifs on a same plane in an overlapping manner.

(14) The fourteenth feature of the present invention resides in a method of preparing a diffraction grating recording medium in which a motif is represented by diffraction gratings, the method comprising:

a first stage for preparing a plurality of pixel patterns in which grating lines of a predetermined width are arranged within a predetermined closed area at a predetermined pitch and at a predetermined angle, wherein at least one of three parameters of line width, pitch and angle is varied for the respective pixel patterns;

a second stage for preparing a plural sets of motif pixel information in each of which a motif is represented by defining a plurality of pixels respectively having a predetermined pixel value on an arrangement of M rows by N columns with respect to plural different motifs, respectively;

a third stage for defining a unit sub-pixel arrangement comprised of sub-pixels arranged in a matrix of m rows by n columns and preparing sub-pixel constitutive information in which a relationship between respective sub-pixel positions within the unit sub-pixel arrangement and respective motifs is determined;

a fourth stage for defining a correspondence relationship between respective pixels defined in the motif pixel information and respective pixel patterns prepared at the first stage by making reference to pixel values with respect to respective pixels; and a fifth stage for disposing the unit sub-pixel arrangements themselves in a matrix of M rows by N columns to thereby define a sub-pixel arrangement of (m×M) rows by (n×M) columns, selecting pixel patterns corresponding to respective unit sub-pixel arrangement for every respective motif on the basis of the correspondence relationship and disposing the selected pixel patterns at predetermined sub-pixel positions on the basis of the sub-pixel constitutive information.

(15) The fifteenth feature of the present invention resides in a method of preparing a diffraction grating recording medium in which a motif is represented by diffraction gratings;

the method comprising:

a first stage for preparing a plurality of pixel patterns in which grating lines of a predetermined width are arranged within a predetermined closed area at a predetermined pitch and at a predetermined angle, wherein at least one of three parameters of line width, pitch and angle is varied for the respective pixel patterns;

a second stage for preparing a plural sets of motif pixel information in each of which a motif is represented by defining a plurality of pixels respectively having a predetermined pixel value on an arrangement of M rows by N columns with respect to plural different motifs, respectively;

a third stage for defining a unit sub-pixel arrangement comprised of sub-pixels arranged in a matrix of m rows by n columns and preparing sub-pixel constitutive information in which a relationship between respective sub-pixel positions within the unit sub-pixel arrangement and respective motifs is determined;

a fourth stage for defining a correspondence relationship between respective pixels defined in the motif pixel information and respective pixel patterns prepared at the first stage by making reference to pixel values with respect to respective pixels; and a fifth stage for disposing the unit sub-pixel arrangements themselves in a matrix of (M/m) rows by (N/n) columns to thereby define a sub-pixel arrangement of M rows by N columns, picking up pixel patterns corresponding to respective sub-pixels for every respective motif on the basis of the correspondence relationship, selecting a pixel pattern respectively, among the pixel patterns which have been picked up, for respective sub-pixels on the basis of the sub-pixel constitutive information and disposing the selected pixel pattern at a position of the respective sub-pixels.

(16) The sixteenth feature of the present invention resides in a method of preparing a diffraction grating recording medium according to the tenth feature, wherein a plurality of pixel patterns are prepared, the pixel patterns having different ratios, each other, of a closed area where grating lines are to be disposed to a full occupation area as a pixel, and wherein a particular pixel pattern is disposed at a position of respective pixels so that a ratio of a closed area to a full occupation area of the disposed particular pixel pattern correspond to a pixel value of the respective pixels thereby to represent a half-tone motif.

(17) The seventeenth feature of the present invention resides in an apparatus for preparing a diffraction grating recording medium in which a motif is represented by diffraction gratings, the apparatus comprising:

means for holding a pixel pattern file, the pixel pattern file containing a plurality of pixel patterns where grating lines of a predetermined width are arranged within a predetermined closed area at a predetermined pitch and at a predetermined angle, wherein at least one of three parameters of line width, pitch and angle is varied for the respective pixel patterns;

means for inputting a motif pixel information file in which a motif is represented by defining a plurality of pixels respectively having a predetermined pixel value at predetermined positions on a plane;

means for preparing a correspondence relationship information file in which a correspondence relationship between respective pixels defined in the motif pixel information file and respective pixel patterns prepared in the pixel pattern file is defined by making reference to pixel values with respect to respective pixels;

means for preparing a picture data which represents a picture image by arranging pixel patterns at predetermined pixel positions on the basis of the correspondence relationship information file; and means for forming a diffraction grating pattern onto a predetermined recording medium on the basis of the picture data.

(18) The eighteenth feature of the present invention resides in an apparatus for preparing a diffraction grating recording medium according to the seventeenth feature, which further comprises means for holding a sub-pixel constitutive information file, the sub-pixel constitutive file containing a relationship between respective sub-pixel positions within a unit sub-pixel arrangement comprised of sub-pixels arranged in a matrix of m rows by n columns, and respective motifs, wherein the means for preparing a picture data carries out an arrangement process of pixel patterns on the basis of the sub-pixel constitutive information file.

(19) The nineteenth feature of the present invention resides in a diffraction grating recording medium in which a half-tone motif is represented by diffraction gratings, characterized in that a plurality of pixel patterns in which grating lines of a predetermined width are arranged within a predetermined closed area at a predetermined pitch are defined by varying an arrangement angle of grating lines and these plurality of pixel patterns are arranged on a plane of a medium to thereby represent the motif, wherein a particular pixel pattern is arranged at a position of a particular pixel which constitutes the motif so that an arrangement angle of grating lines of the particular pixel pattern corresponds to a pixel value of the particular pixel.

(20) The twentieth feature of the present invention resides in a diffraction grating recording medium according to the nineteenth feature, wherein plural groups of pixel patterns are defined, each group being comprised of a plurality of pixel patterns having a grating line arrangement angle similar to each other and pixel patterns belonging to different groups are arranged for different motifs thereby to represent a plurality of half-tone motifs on a same plane in an overlapping manner.

(21) The twenty first feature of the present invention resides in a method of preparing a diffraction grating recording medium in which a half-tone motif is represented by diffraction gratings, the method comprising:

a pattern definition stage for defining a plurality of pixel patterns in which grating lines of a predetermined line width are arranged within a predetermined closed area by varying arrangement angle of grating lines;

a motif preparation stage for preparing motif pixel information in which a half-tone motif is represented by defining a plurality of pixels respectively having a predetermined density value at predetermined positions on a plane; and a pattern arrangement stage for making the pixel patterns correspond to the respective pixels on the basis of the respective density values in the motif pixel information and arranging corresponding pixel patterns at respective pixel positions.

(22) The twenty second feature of the present invention resides in a method of preparing a diffraction grating recording medium according to the twenty first feature, the method further comprising:

a pattern inspection stage for determining a peculiar display mode on a display screen with respect to respective plural pixel patterns and displaying individual pixel patterns arranged on the display screen by the respective peculiar display mode.

(23) The twenty third feature of the present invention resides in a method of preparing a diffraction grating recording medium according to the twenty second feature, wherein only pixel patterns in which arrangement angle of grating lines falls within a predetermined range are displayed on the display screen at the pattern inspection stage.

(24) The twenty fourth feature of the present invention resides in a method of preparing a diffraction grating recording medium according to the twenty second feature, wherein display luminance of pixel patterns on the display screen is varied in accordance with an arrangement angle of grating lines at the pattern inspection stage.

(25) The twenty fifth feature of the present invention resides in a method of preparing a diffraction grating recording medium comprising:

a first stage for representing a picture pattern having a plurality of closed areas by contour lines of the respective closed areas to prepare a contour line data indicating the contour lines;

a second stage for preparing a grating condition data in which line width, pitch and arrangement angle of grating lines constituting a diffraction grating are set for respective closed areas of the picture pattern;

a third stage for generating a grating pattern in which grating lines of a predetermined line width are arranged at a predetermined pitch and at a predetermined angle within the respective closed areas of the picture pattern on the basis of the contour line data and the grating condition data to prepare a grating data indicating the grating pattern; and a fourth stage for forming the grating pattern onto a physical medium on the basis of the grating data.

(26) The twenty sixth feature of the present invention resides in an apparatus for preparing a diffraction grating recording medium comprising:

contour line data preparation means for representing a picture pattern having a plurality of closed areas by contour lines of the respective closed areas and preparing a contour line data indicating the contour line;

grating condition setting means for preparing a grating condition data in which line width, pitch and arrangement angle of grating lines constituting a diffraction grating are set for the respective closed areas of the picture pattern on the basis of an input from an operator;

grating data preparation means for generating a grating pattern in which grating lines of a predetermined width are arranged at a predetermined pitch and at a predetermined angle within the respective closed areas of the picture pattern on the basis of the contour line data and the grating condition data and preparing a grating data indicating the grating pattern; and medium preparation means for forming the grating pattern on a physical medium on the basis of the grating data.

(27) The twenty seventh feature of the present invention resides in an apparatus for preparing a diffraction grating recording medium according to the twenty sixth feature, wherein, with respect to a picture pattern represented by multiple loops, the grating condition setting means carries out preparation of a grating condition data by handling an area encompassed by one loop or an area between adjacent two loops as an individual closed area.

(28) The twenty eighth feature of the present invention resides in an apparatus for preparing a diffraction grating recording medium according to the twenty sixth feature, wherein the grating condition setting means has a function such that when it carries out setting of a grating condition data with respect to adjacently disposed plural closed areas, it inputs, from an operator, an initial data indicating a grating condition data with respect to one closed area and a change data indicating difference with respect to the initial data, and it automatically sets a grating condition data with respect to other closed areas on the basis of the initial data and the change data.

(29) The twenty ninth feature of the present invention resides in an apparatus for preparing a diffraction grating recording medium according to the twenty sixth feature, wherein the grating condition setting means has a function such that when it carries out setting of a grating condition data with respect to a plurality of closed areas adjacently disposed, it inputs, from an operator, an initial data indicating a grating condition data with respect to a first closed area and an end data indicating a grating condition data with respect to a second closed area, and it automatically sets a grating condition data with respect to a closed area between the first closed area and the second closed area by interpolation based on the initial data and the end data.

(30) The thirtieth feature of the present invention resides in an apparatus for preparing a diffraction grating recording medium according to the twenty sixth feature, wherein the grating data preparation means generates parallel lines at a predetermined pitch and at a predetermined angle based upon the grating condition data in generating a grating pattern with respect to one closed area, determines intersecting points of the parallel lines and a contour line with respect to the closed area, defines line segments having intersecting points at both end points and carries out thickening process for allowing the line segments to have a predetermined width based on the grating condition data.

(31) The thirty first feature of the present invention resides in a diffraction grating recording medium having a plurality of closed areas on a surface thereof, a diffraction grating being formed by a plurality of grating lines within the respective closed areas, visual discrimination between at least adjacent closed areas being permitted by varying any one of line width, pitch and arrangement angle of grating lines forming the diffraction grating and a predetermined picture pattern being constituted by the plurality of closed areas.

BRIEF DESCRIPTION OF THE DRAWINGS

FIGS. 1a, 1b are views showing an example of pattern and pixel information used as a motif of a diffraction grating recording medium according to this invention.

FIG. 2 is a view showing an example of a pixel pattern used in the diffraction grating recording medium according to this invention.

FIGS. 9a, 9b are views showing an example of two motifs recorded in an overlapping manner onto the diffraction grating recording medium according to this invention.

FIG. 10 is a view showing one example of pixel patterns respectively used in two motifs shown in FIGS. 9a, 9b.

FIG. 20 is a view showing pixel patterns laid out for respective elements of the arrangement of "unit sub-pixel arrangements" shown in FIG. 19a.

FIGS. 23a, 23b, 23c are views showing another example of the configuration of sub-pixel constitutive information utilized in this invention.

FIGS. 24a, 24b are views showing an example of the configuration of sub-pixel constitutive information suitable in the case where three motifs are represented in an overlapping manner.

FIG. 25 is a view showing pixel arrangement with respect to motif A.

FIG. 26 is a view showing pixel arrangement with respect to motif B.

FIGS. 31a, 31b are views showing various shapes of pixels which can be utilized for a diffraction grating recording medium according to this invention.

FIG. 32 is a view showing pixel patterns used in the case of carrying out representation of half-tone motif by this invention.

FIGS. 33a to 33e are views for explaining a relationship between direction of observation of a diffraction grating and brightness, this relationship providing a fundamental principle of this invention.

FIG. 34 is a view showing an example of a plurality of pixel patterns used for representing different density values in this invention.

FIGS. 35a, 35b are views showing density values of respective pixels constituting a half-tone motif and pixel patterns corresponding thereto.

FIGS. 36a, 36b are views for explaining that a reversal phenomenon of negative/positive takes place in dependency upon directions of observation in the diffraction grating recording medium according to this invention.

DESCRIPTION OF THE PREFERRED EMBODIMENTS

Figure 3:
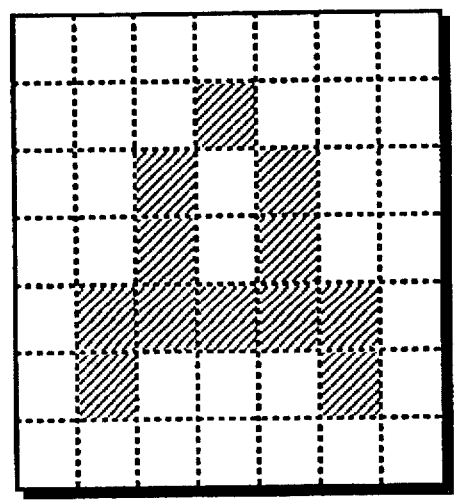
FIG. 3 is a view showing a diffraction grating recording medium prepared by using the motif shown in FIGS. 1a, 1b and the pixel pattern shown in FIG. 2.

This invention will now be described in accordance with several embodiments shown.

§1. Fundamental Embodiment Based On The First Approach

The feature of a diffraction grating recording medium according to the first approach of this invention resides in that a motif, which is constructed by a set of a plurality of pixels, is represented by diffraction gratings on a medium. Here, a method of representing a relatively simple motif (indicating character "A" of alphabet) as shown in FIG. 1a on a diffraction grating recording medium by this invention will now be described. It is to be noted that it is a premise that the method of preparing a diffraction grating recording medium according to this invention is carried out by using computer, and respective processes described below are all executed by using computer.

Initially, as a picture data which is corresponding to the motif shown in FIG. 1a, motif pixel information as shown in FIG. 1b is prepared. In the example shown here, pixels are arranged in a form of matrix of 7 rows by 7 columns. Respective pixels have a pixel value of "0" or "1" and serve as information indicating so called binary picture. Such information is a general picture data so called "raster picture data", and can be prepared by ordinary picture drawing apparatus. In addition, such motif pixel information shown in FIG. 1b may be prepared by inputting a design picture depicted on a paper by using a scanner device.

Subsequently, as shown in FIG. 2, a pixel pattern is defined, in which grating lines with a predetermined line width d are arranged within a predetermined closed area V at a predetermined pitch p and at a predetermined angle θ. Here, the closed area V is an area constituting one pixel, and is actually formed as a very small element. In other words, the closed area V has dimensions corresponding to each pixel in the arrangement of 7 rows by 7 columns shown in FIGS. 1a, 1b. In this embodiment, a rectangle having longitudinal and lateral dimensions of 50 μm×45 μm is used as the closed area V. Further, the line width d and the pitch p of the grating lines L arranged within the closed area V also have very small dimensions in conformity with wavelength of light. In this embodiment, the line width d and the pitch p become equal to 0.6 μm and 1.2 μm, respectively. In short, it is necessary that the grating lines L are arranged at the line width d and the pitch p sufficient to perform function as a diffraction grating. In this case, the arrangement angle θ of the grating lines L is an angle set relative to a predetermined reference axis. In this specification, it is assumed that an XY coordinate system in which an X-axis and a Y-axis are taken in directions as shown is defined, and that the arrangement angle θ of the grating lines L is represented with the X-axis being as the reference axis. Such a pixel pattern shown in FIG. 2 is also prepared as a picture data on computer. It is to be noted that the picture data of this pixel pattern may be prepared as "raster picture data" (in this case, respective pixels constituting motif are constituted by very smaller pixels), or may be prepared as "vector picture data" in which contour line of the grating line L is defined by designating coordinate values of four vertices of square constituting the grating line L. It is preferable that the latter is employed in order to suppress data quantity.

Then, the pixel pattern as shown in FIG. 2 is caused to correspond to predetermined pixels on the basis of respective pixel values in motif pixel information as shown in FIG. 1b, thus to carry out a process for disposing corresponding pixel patterns at respective pixel positions. In more practical sense, the pixel pattern of FIG. 2 is caused to correspond to respective pixels having a pixel value of "1" in motif pixel information shown in FIG. 1b. On the contrary, no pixel pattern is caused to correspond to pixels having a pixel value of "0". Pixel patterns are respectively arranged at pixel positions which correspond to in this way. So to speak, when the arrangement shown in FIG. 1b is assumed to be a wall, a work for setting or laying tiles, one of the tiles being shown in FIG. 2, one by one is carried out in respective areas depicted "1" in the wall. As a result, a picture pattern as shown in FIG. 3 is obtained. This picture pattern is a pattern finally recorded on a diffraction grating recording medium. The motif shown in FIG. 1a is represented as it is, but each pixel is constituted with a diffraction grating. Thus, visual effect is obtained as the diffraction grating.

Figure 4:
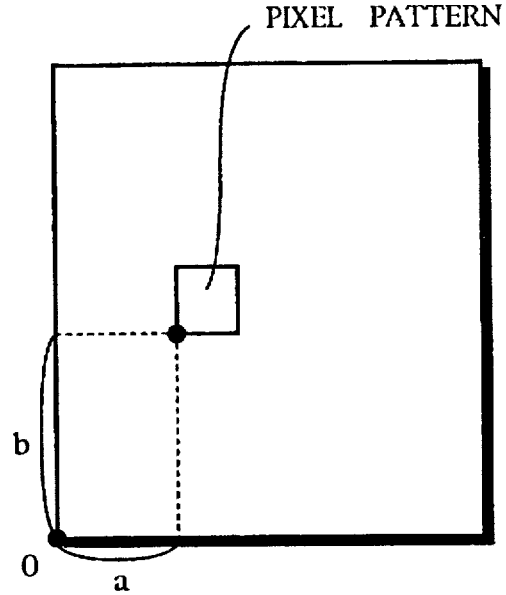
FIG. 4 is a view showing concept of setting or laying process for preparing the diffraction grating recording medium shown in FIG. 3.

Practically, a process for setting or laying pixel patterns as shown in FIG. 2 as "tile" is carried out as picture data processing in the computer. This process may be executed as shown in FIG. 4, for example, to determine offset quantities a, b based on pixel positions to be set or laid by calculation when coordinate origin O is taken at the most right and the lowest position of the picture corresponding to the entirety of the motif. As a result of such calculation process, a picture data indicating the pattern as shown in FIG. 3 is obtained. Accordingly, if an approach is employed to physically output the pattern as shown in FIG. 3 onto film, etc. on the basis of this picture data, a desired diffraction grating recording medium can be prepared. It is to be noted that, in this embodiment, an approach is employed to give picture data prepared by computer to an electron beam picture drawing apparatus to draw a pattern as shown in FIG. 3 on an original block by using electron beams and to mass-produce pseudo hologram seals by the technique of press by using the original block.

§2. Embodiment Using A Plurality Of Pixel Patterns

While, in the above-described fundamental embodiment, only a pixel pattern as shown in FIG. 2 is used to prepare a diffraction grating recording medium, a method using plural kinds of pixel patterns will be described below. As shown in FIG. 2, a pixel pattern can be specified by three parameters of line width d, pitch p and arrangement angle θ of grating line L. By varying at least one of these three parameters, different patterns are obtained. In more practical sense, when line width d and pitch p are varied, color observed from that pattern is varied. On the other hand, when arrangement angle θ is varied, direction in which that pattern can be observed is varied. Accordingly, plural kinds of pixel patterns in which parameters are varied are prepared to properly use them, thereby making it possible to form a varied and effective pseudo hologram image.

Figures 5, 6A, 6B:
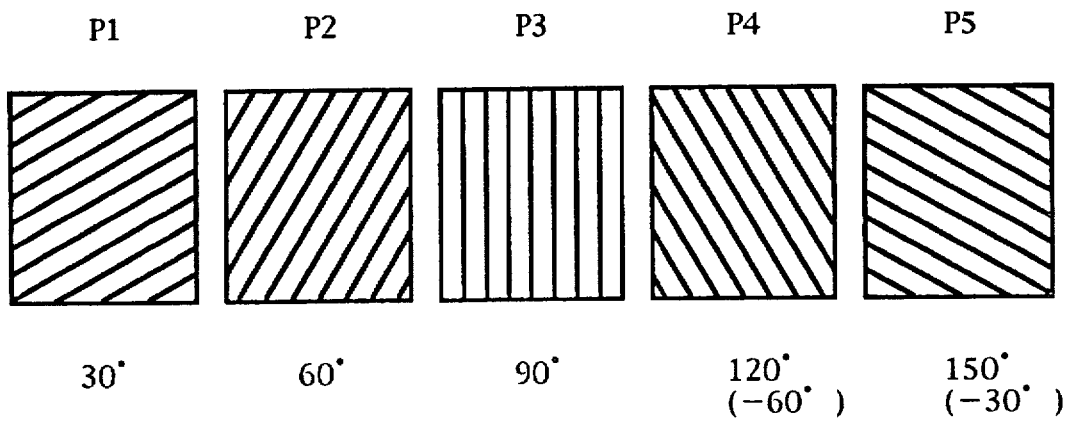
FIG. 5 is a view showing one example of a plurality of pixel patterns used in the diffraction grating recording medium according to this invention.
FIGS. 6a, 6b are views showing correspondence relationship information defining correspondence relationship between the motif shown in FIG. 1a and the pixel pattern shown in FIG. 5.

A practical example will be as shown below. For example, five kinds of pixel patterns P1 to P5 as shown in FIG. 5 are prepared. These pixel patterns are such that line width d and pitch p of the three parameters are the same, but angles θ are respectively different. Namely, as shown, five kinds of angles θ=30°, 60°, 90°, 120°, 150° are prepared (although actual grating lines have a predetermined width, their indication employed here is carried out by only line in the drawings shown below for the brevity of illustration).

In the case where a plurality of pixel patterns are used in this way, it is necessary to determine the relationship between pixel positions and pixel patterns arranged thereat. In view of this, correspondence relationship information as shown in FIG. 6a is prepared. This correspondence relationship information is information indicating that any one of five kinds of pixel patterns P1 to P5 shown in FIG. 5 is caused to correspond to respective pixels where a pixel value indicates "1" in the motif pixel information shown in FIG. 1b. Any pixel pattern is not caused to correspond to pixels where a pixel value indicates "0" (alternatively, a vacant pixel pattern P0 where no grating line is formed is defined to allow the vacant pixel pattern P0 to correspond to pixels where a pixel value indicates "0"). This correspondence relationship information can be indicating "the relationship between five kinds of tiles and positions where respective tiles are set". Accordingly, if such correspondence relationship information is prepared, a simple setting work by computer can be carried out. It is to be noted that while information specifying names P1 to P5 of pixel patterns are used as correspondence relationship information in the example of FIG. 6a, information specifying values of angles θ of grating lines (i.e., values of parameters) as in the example of FIG. 6b may be used.

A pseudo hologram image formed by using the five kinds of pixel patterns in this way is more full of variety. In the case where a plurality of pixel patterns in which a parameter of angle θ is changed are used as in this example, angles where light is observed in respective left and right portions in the motif shown in FIG. 1a are different. For this reason, when observation is carried out with an actual recording medium being taken by the hand and inclined, a special effect such that light trace takes place in left and right directions is obtained. If a plurality of pixel patterns where a parameter of line width d or pitch p is varied are used, a special effect such that colors observed are different in left and right directions can be obtained. It is of course that various pixel patterns where two parameters or more are varied may be prepared.

Meanwhile, in order to prepare correspondence relationship information as shown in FIG. 6, it is necessary to give some instructions to computer. The most fundamental instructing method is a method for displaying motif as shown in FIG. 1a on a display to designate any one of P1 to P5 (or 30° to 150°) with respect to respective pixels constituting this motif. If correspondence relationship information is prepared by such a method, it is possible to define entirely arbitrary correspondence relationship. However, a work for designating corresponding pixel patterns one by one with respect to respective pixels considerably takes labor and time. In view of this, in this embodiment, function capable of preparing correspondence relationship information by simple operation is prepared in advance in program of computer. When attention is now drawn to the correspondence relationship information shown in FIG. 6b, a certain regularity can be found. Namely, a pixel pattern of θ=30° is caused to correspond to pixels of the second column, and a pixel pattern of θ=15° is caused to correspond to pixels of the sixth column. According as the pixel position shifts from the second column to the sixth column, the value of θ increases by 30°. The technique of gradually varying parameter in this way is generally called "gradation". In this example, gradation is applied in a horizontal direction.

Figures 7, 8:
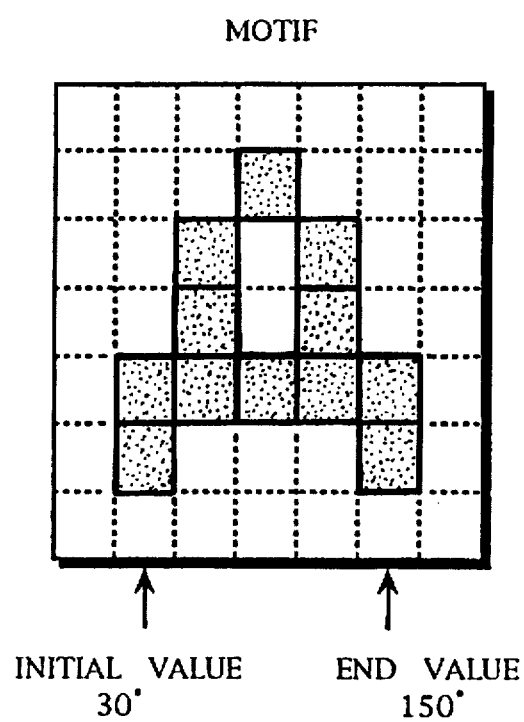
FIG. 7 is a view showing an embodiment of a method of preparing the correspondence relationship information shown in FIGS. 6a, 6b.
FIG. 8 is a view showing an example of pixel information with respect to a half-tone motif.

Preparation of correspondence relationship information for applying such gradation can be carried out by a simple work described below. Namely, as shown in FIG. 7, an approach may be employed to display a motif on a display screen thereafter to give an instruction to prepare correspondence relationship information for applying gradation. In more practical manner, it is sufficient to give an instruction to apply gradation in the horizontal direction, and to designate pixel position of the second column by means of mouse, etc. to input an initial value θ=30° and to designate pixel position of the sixth column by means of mouse. etc. to input an end value θ=150°. When such information is given, a linear interpolation is implemented to pixels of the third to fifth columns, thereby making it possible to automatically set the value of θ. Accordingly, it is unnecessary for an operator to designate corresponding pixel patterns with respect to respective pixels. Of course, such a setting to apply gradation in a vertical direction may be similarly carried out. In addition, while gradation relating to angle θ is applied here, gradation relating to line width d or pitch p of grating lines may be similarly set.

It is to be noted that while pixel arrangement of relatively small scale of 7×7 is provided in the example shown, a motif of a larger scale of pixel arrangement is used in practice. Accordingly, there are instances where if there is employed a method of designating only an initial value and an end value, there results a very large number of variations of pixel patterns. For example, assuming that 121 pixels exist from the pixel where an initial value is designated up to the pixel where an end value is designated, the value of θ increases in order of 30°, 31°, 32°, . . . , 149°, 150° from the right pixel toward the left pixel in a setting as described above. As a result, 121 kinds of pixel patterns are required. In such a case, it is sufficient to designate step value in addition to the initial value and the end value. For example, if 30° is designated as step value, variation of the value of θ is limited to five kinds of values of 30°, 60°, 90°, 120°, 150°. For this reason, it is sufficient to prepare five kinds of pixel patterns as shown in FIG. 5.

The motif pixel information shown in FIG. 1b is binary picture information in which respective pixel values take either "0" or "1". However, in the case where a picture having gradation is used as a motif, it is possible to determine, on the basis of respective pixel values, pixel patterns to correspond thereto. Let now consider, e.g., the case where motif pixel information as shown in FIG. 8 is given in place of motif pixel information shown in FIG. 1b. In this case, respective pixel values take any value of 0 to 255. It is now assumed that a rule described below is defined in order to allow respective pixels having such pixel values to correspond to one of five kinds of pixel patterns P1 to P5 shown in FIG. 5.

Pixels having pixel value of 50 or less:
  no correspondence
pixels having pixel value of 51 to 100:
  P1 is caused to correspond thereto
pixels having pixel value of 101 to 150:
  P2 is caused to correspond thereto
pixels having pixel value of 151 to 200:
  P3 is caused to correspond thereto
pixels having pixel value of 201 to 250:
  P4 is caused to correspond thereto
pixels having pixel value of 251 or more:
  P5 is caused to correspond thereto If such a rule is defined, it is possible to automatically set correspondence relationship information as shown in FIG. 6 on the basis of motif pixel information as shown in FIG. 8.

§3. Embodiment Representing A Plurality Of Motifs

Figures 11A, 11B, 12:
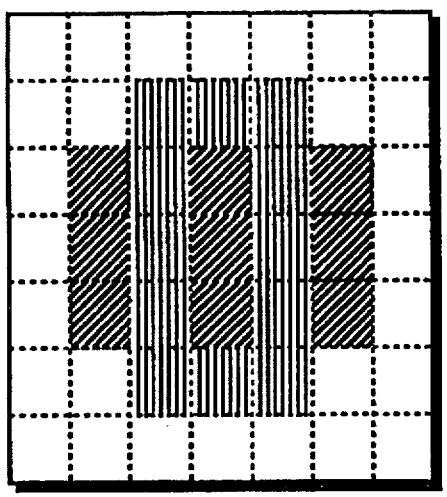
FIGS. 11a, 11b are views showing correspondence relationship information defining correspondence relationship between the two motifs shown in FIGS. 9a, 9b and the two pixel patterns shown in FIG. 10.
FIG. 12 is a view showing a diffraction grating recording medium prepared by using the two motifs shown in FIGS. 9a, 9b, the two pixel patterns shown in FIG. 10, and the correspondence relationship information shown in FIGS. 11a, 11b.

Subsequently, the embodiment in which a plurality of motifs are represented in an overlapping manner on the same plane will be described. For example, let consider the case where motif A shown in FIG. 9a and motif B shown in FIG. 9b are given to represent these two motifs on the same plane in an overlapping manner. In this case, two pixel patterns P1, P2 as shown in FIG. 10 are prepared. Here, pixel patterns P1, P2 are the same in line width d and pitch p of grating lines, but angle θ is 45° in the case of P1 whereas angle θ is 90° in the case of P2. Then, correspondence information is prepared so that pixel pattern P1 is caused to correspond to pixels belonging to the motif A and pixel pattern P2 is caused to correspond to pixels belonging to the motif B. In more practical sense, correspondence relationship information R1, in which pixel pattern P1 is caused to correspond to pixels having pixel value "1" in the motif A, is prepared as shown in FIG. 11a, and correspondence relationship information R2, in which pixel pattern P2 is caused to correspond to pixels having pixel value "1" in the motif B, is prepared as shown in FIG. 11b. If the process for setting pixel patterns P1, P2 is carried out on the basis of these two correspondence relationship information R1, R2, a diffraction grating recording medium having a diffraction grating pattern as shown in FIG. 12 is prepared. In this case, the motif A is represented by a diffraction grating of θ=45° and the motif B is represented by that of θ=90°. For this reason, observable angles of both the motifs are different. Thus, they are observed in a manner distinguished as separate motifs. In accordance with this method, it is possible to represent a plurality of motifs (three motifs or more can be represented) on the same plane in an overlapping manner.

Figures 13, 14A, 14B:
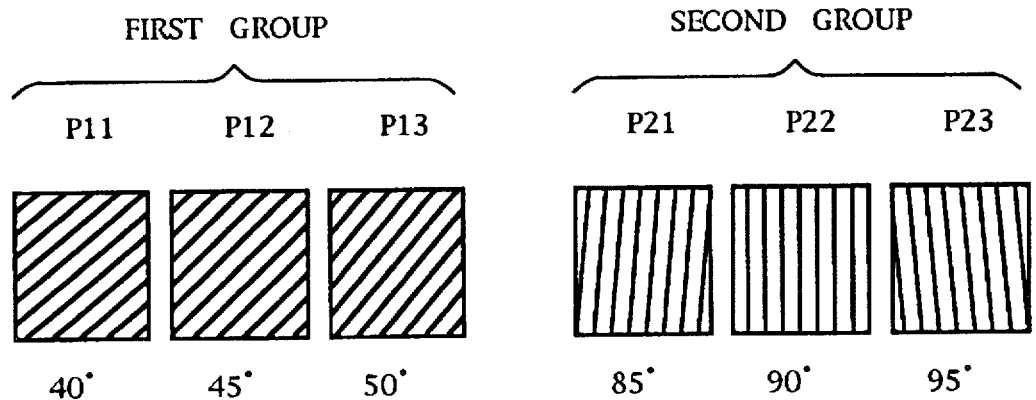
FIG. 13 is a view showing one example of pixel patterns belonging to two groups respectively used with respect to the two motifs shown in FIGS. 9a, 9b.
FIGS. 14a, 14b are views showing correspondence relationship information defining correspondence relationship between the two motifs shown in FIGS. 9a, 9b and the two pixel patterns shown in FIG. 13.

Moreover, a plurality of pixel patterns may be used in the same motif. In this case, it is desirable for permitting distinction from other motifs to define a plurality of pixel patterns having parameters similar to each other as one group. For example, six kinds of pixel patterns shown in FIG. 13 are classified into three pixel patterns P11, P12, P13 belonging to the first group, and three pixel patterns P21, P22, P23 belonging to the second group. These pixel patterns are all the same in line width d and pitch p, and are different in angles θ with respective thereto. It is to be noted that angles θ of pixel patterns belonging to the first group take values of 40°, 45°, 50° similar to each other, and angles θ of pixel patterns belonging to the second group take values of 85°, 90°, 95° similar to each other. When these six kinds of pixel patterns are prepared, it is possible to allow the pixel patterns belonging to the first group to correspond to pixels belonging to the motif A, and to allow the pixel patterns belonging to the second group to correspond to pixels belonging to the motif B. In more practical sense, it is sufficient to prepare correspondence relationship information R1 as shown in FIG. 14a with respect to the motif A shown in FIG. 9a, and to prepare correspondence relationship information R2 as shown in FIG. 14b with respect to the motif B shown in FIG. 9b. A grating pattern on the diffraction grating recording medium prepared by using such correspondence relationship information is substantially the same as that shown in FIG. 12. However, since grating angle values are slightly dispersed even within the same motif, more effective representation can be made. It is to be noted that since grating angle value is dispersed by ±5° with θ=45° being as a center with respect to the motif A, whereas it is dispersed by ±5° with θ=90° being as a center with respect to the motif B, it is sufficiently possible to recognize the motifs A and B in a distinguished manner therebetween.

Figure 15A:
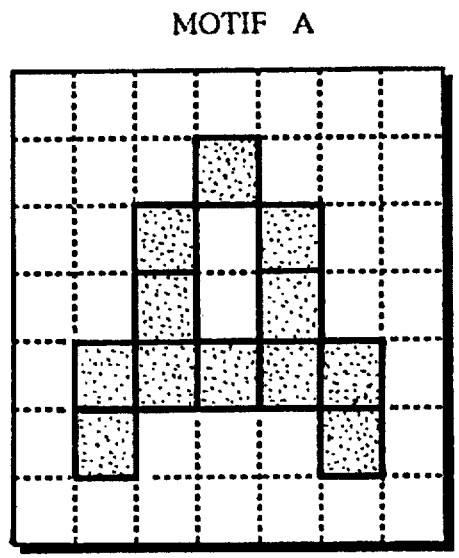
FIGS. 15a, 15b are views showing another example of two motifs recorded in an overlapping manner onto the diffraction grating recording medium according to this invention.
Figure 15B:
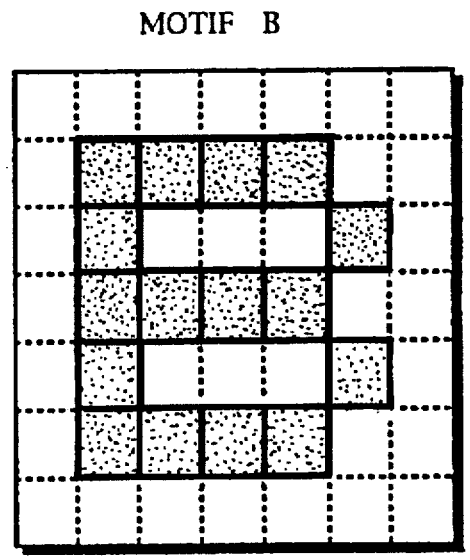
Figure 16A:
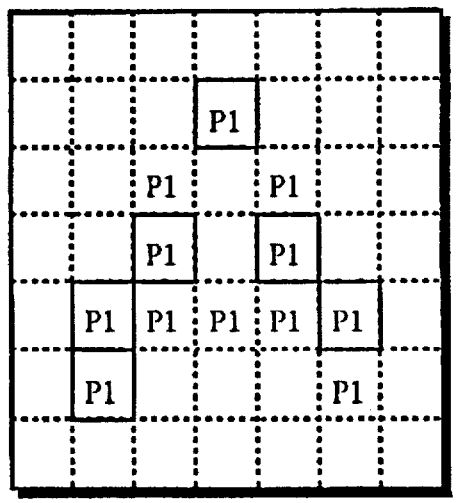
FIGS. 16a, 16b are views showing correspondence relationship information defining correspondence relationship between the two motifs shown in FIGS. 15a, 15b and the two pixel patterns shown in FIG. 10.
Figure 16B:
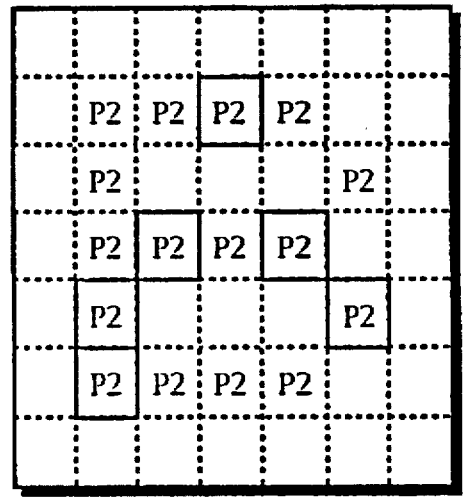

§4. Embodiment Representing A Plurality Of Motifs In Which Pixels Overlap With Each Other In the previously described example, since pixels having pixel value "1" do not overlap with respect to two motifs A, B shown in FIG. 9, representation in which pixels of both the motifs are mixed can be made as shown in FIG. 12. However, with respect to a plurality of motifs in which pixels having pixel value "1" overlap with each other, it is impossible to apply a technique as in the previously described example thereto as it is. It is now assumed that the previously described technique is applied to two motifs A, B as shown in FIGS. 15a and 15b to proceed with work. Further, let suppose that the pattern P1 shown in FIG. 10 is caused to correspond to pixels with respect to the motif A, and that the pattern P2 shown in FIG. 10 is caused to correspond to pixels with respect to the motif B. Thus, correspondence relationship information R1 as shown in FIG. 16a is prepared with respect to the motif A, and correspondence relationship information R2 as shown in FIG. 16b is prepared with respect to the motif B. However, if an attempt is made to carry out work for actually setting pixel patterns on the basis of these two correspondence relationship information R1, R2, collision of pixel pattern takes place with respect to pixels encompassed by the solid lines in FIG. 16. For example, when attention is drawn to pixel at the second row and the third column, the purport to set pixel pattern P1 is indicated in accordance with correspondence relationship information R1, whereas the purport to set pixel pattern P2 is indicated in accordance with correspondence relationship information R2. For this reason, it becomes unable to judge, from a practical point of view, which one of pixel patterns should be set.

Figure 17:
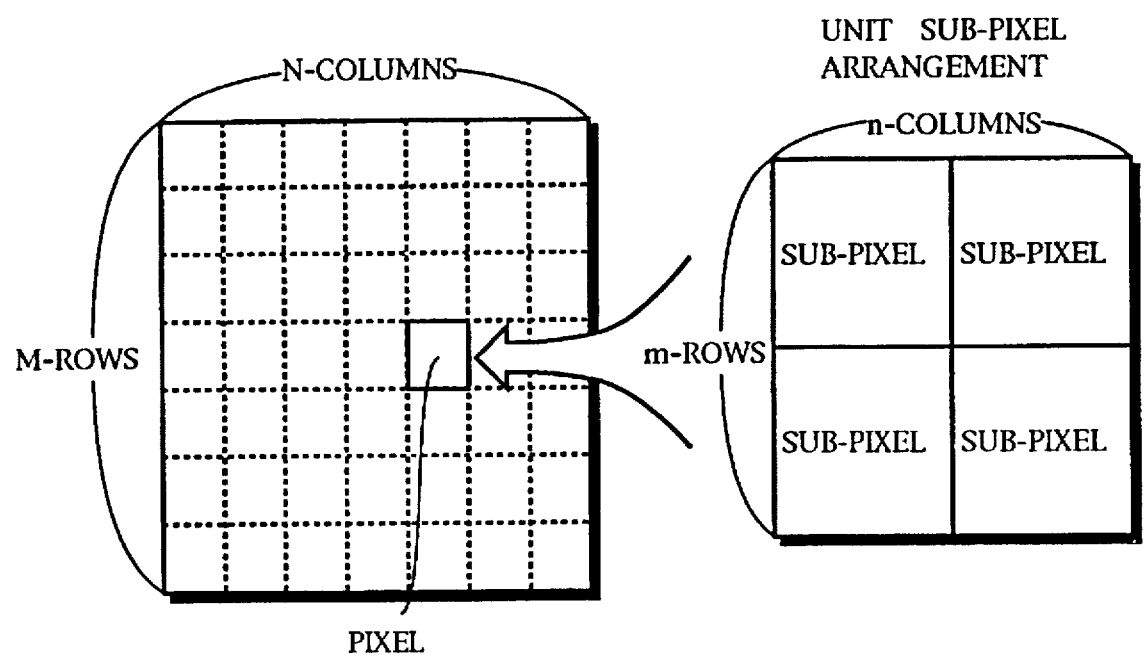
FIG. 17 is a view for explaining concept of "an unit sub-pixel arrangement" used in this invention.
Figure 18:
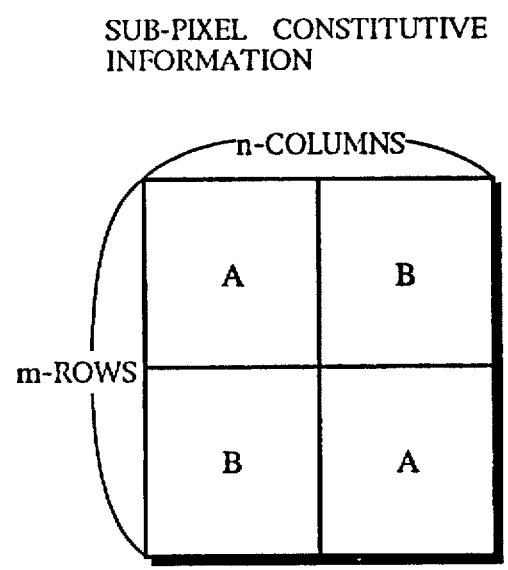
FIG. 18 is a view showing an example of sub-pixel constitutive information defined with respect to "the unit sub-pixel arrangement" shown in FIG. 17.

To solve such problem, the concept of a sub-pixel as described below is introduced. Let now consider the case where a predetermined motif is represented by pixel arrangement of M rows by N columns (7 rows by 7 columns in this example as shown in FIG. 17). In this case, "unit sub-pixel arrangement" comprised of sub-pixels arranged in a form of matrix of m rows by n columns (two rows by two columns in this example) is defined as shown in the right part of FIG. 17. In this example, this "unit sub-pixel arrangement" has dimensions corresponding to one pixel. Explanation will be given in more practical sense. In the example shown in FIG. 17, a quarter of one pixel corresponds to a sub-pixel, and one "unit sub-pixel arrangement" is constituted by four sub-pixels. Subsequently, sub-pixel constitutive information in which the relationship between respective sub-pixel positions in the "unit sub-pixel arrangement" and pixels of respective motifs arranged thereat is determined is prepared. For example, in the case of displaying the motifs A and B in an overlapping manner, either pixels of motif A or pixels of motif B are arranged at respective sub-pixel positions. In view of this, sub-pixel constitutive information as shown in FIG. 18 is prepared to define the relationship between respective sub-pixel positions and pixels of respective motifs arranged thereat. In the example of FIG. 18, definition is made such that pixels of the motif A are arranged at left upper and right lower sub-pixel positions and pixels of the motif B are arranged at left lower and right upper sub-pixel positions. For this purpose, any definition may be made. However, in view of equally displaying both motifs, it is preferable to arrange pixels of the same motif at diagonal positions in this way.

Figure 19A:
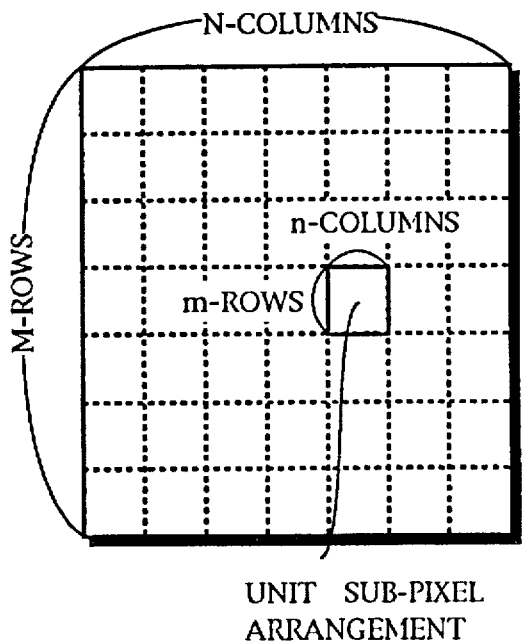
FIG. 19a is a view showing an arrangement of "the unit sub-pixel arrangements" shown in FIG. 17
Figure 19B:
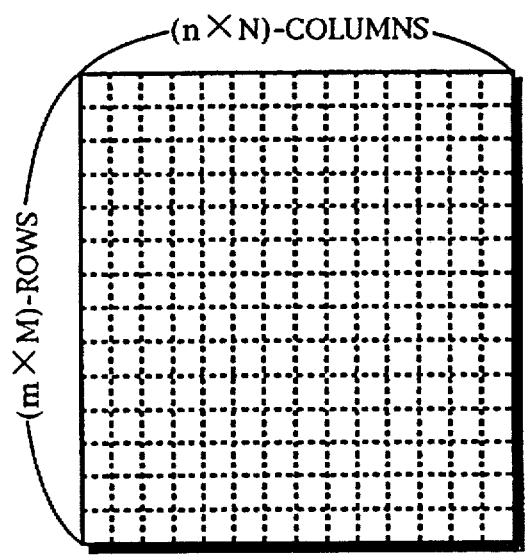
FIG. 19b is a view showing a sub-pixel arrangement corresponding to this arrangement.

Then, "unit sub-pixel arrangements" themselves defined as shown in FIG. 17 are arranged in a forms of matrix of M rows by N columns as shown in FIG. 19a. As previously described, in this example, since "unit sub-pixel arrangement" has dimensions corresponding to one pixel, the arrangement of "unit sub-pixel arrangements" shown in FIG. 19a is the same as the arrangement of pixels shown in the left part of FIG. 17. It is to be noted that in the case where the arrangement of "unit sub-pixel arrangements" shown in FIG. 19a is considered to be an arrangement of "sub-pixels", an arrangement of (m×M) rows by (n×N) columns as shown in FIG. 19b (14 rows by 14 columns in this example) is provided.

Figure 20:
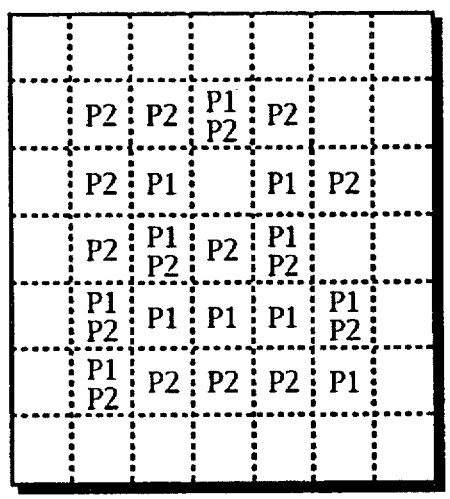
Figure 21A:
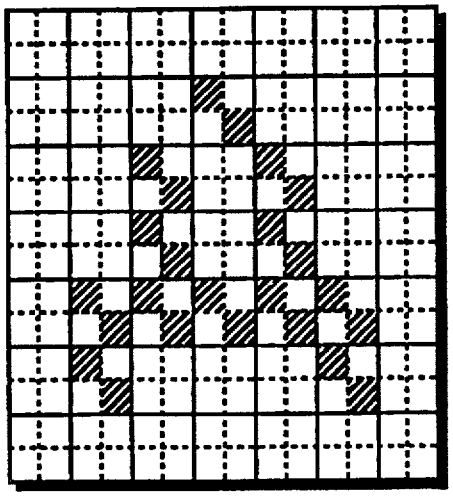
FIGS. 21a, 21b are views showing the state where the pixel patterns shown in FIG. 20 are arranged with respect to respective sub-pixels.
Figure 21B:
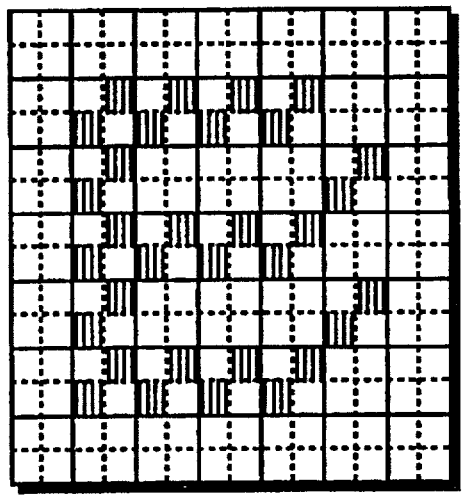
Figure 22:
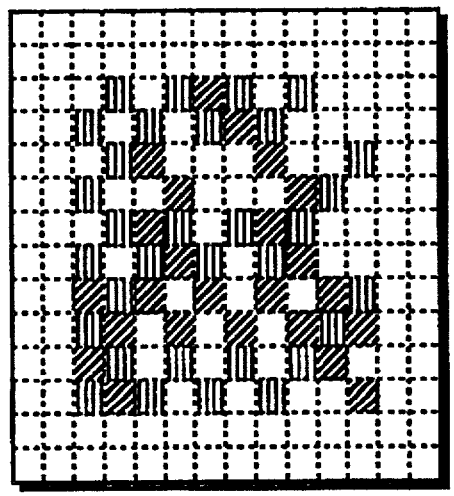
FIG. 22 is a view showing a diffraction grating recording medium prepared by the arrangements shown in FIGS. 21a, 21b.

Meanwhile, as shown in FIGS. 16a, 16b, since correspondence relationship information R1, R2 are respectively obtained with respect to the two motifs A, B, it is possible to reserve a corresponding pixel pattern on respective "unit sub-pixel arrangements" based on the information R1, R2. FIG. 20 shows pixel pattern reserved in this way. It is seen from this figure that either one pixel pattern P1 or P2 is reserved for a first sets of 49 sets of "unit sub-pixel arrangements", and both the pixel patterns P1 and P2 are reserved for a second sets thereof. Subsequently, pixel patterns thus reserved are arranged at predetermined sub-pixel positions on the basis of sub-pixel constitutive information defined in FIG. 18. Namely, pixel patterns P1 with respect to the motif A are arranged, as shown in FIG. 21a, at left upper and right lower sub-pixel positions within the "unit sub-pixel arrangement (indicated by solid line in the figure)". Moreover, pixel patterns P2 with respect to the motif B are arranged, as shown in FIG. 21b, at left lower and right upper sub-pixel positions within the "unit sub-pixel arrangement". When such arrangements are carried out on the same plane, an over lapped pattern as shown in FIG. 22 is obtained. This pattern is a pattern which is actually recorded on an actual diffraction grating recording medium.

Within the pattern shown in FIG. 22, the motif A and the motif B are represented in an overlapping manner. In addition, since formation angle of grating lines in sub-pixels representing the motif A and that in sub-pixels representing the motif B are different, there is provided a pattern such that when observed from a certain one direction, the motif A can be recognized (the pattern as shown in FIG. 21a can be recognized), and when observed from another direction, the motif B can be recognized (the pattern as shown in FIG. 21b can be recognized). Using such a technique, it is possible to represent a plurality of motifs in which pixels overlap with each other on the same plane in an overlapping manner. It is to be noted that since the two motifs A, B shown in FIGS. 15a and 15b are both pictures having lower resolution, patterns shown in FIGS. 21a, 21b exhibit the motifs more considerably distorted than the original ones. However, when pictures having higher resolution are used as motifs, distortion of picture observed hardly constitutes any problem.

It is to be noted that overlapping representation with respect to three motifs or more can be made by this technique. For example, if sub-pixel constitutive information as shown in FIG. 23a is defined, it is possible to represent four motifs A, B, C, D in an overlapping manner on the same plane. Moreover, if sub-pixel constitutive information as shown in FIG. 23b is defined, it is possible to represent three motifs A, B, C in an overlapping manner on the same plane. It should be noted in this case that the three motifs A, B, C are not equal to each other, i.e., density of the motif C is twice greater than those of the motifs A, B. As an irregular example, it is possible to define sub-pixel constitutive information as shown in FIG. 23c. Here, indication of "A+C" means that any one of A and C is indicated here. This is way of definition on the premise that the motif A and the motif C are patterns complementary to each other (patterns such that pixel positions having pixel value "1" do not overlap each other as in the motifs A, B shown in FIG. 9, for example). It is to be noted that in the case where three motifs A, B, C are equally represented in an overlapping manner, it is desirable to define sub-pixel constitutive information as shown FIG. 24a or 24b. In this case, "unit sub-pixel arrangement" is an arrangement of three rows by three columns.

Figure 27:
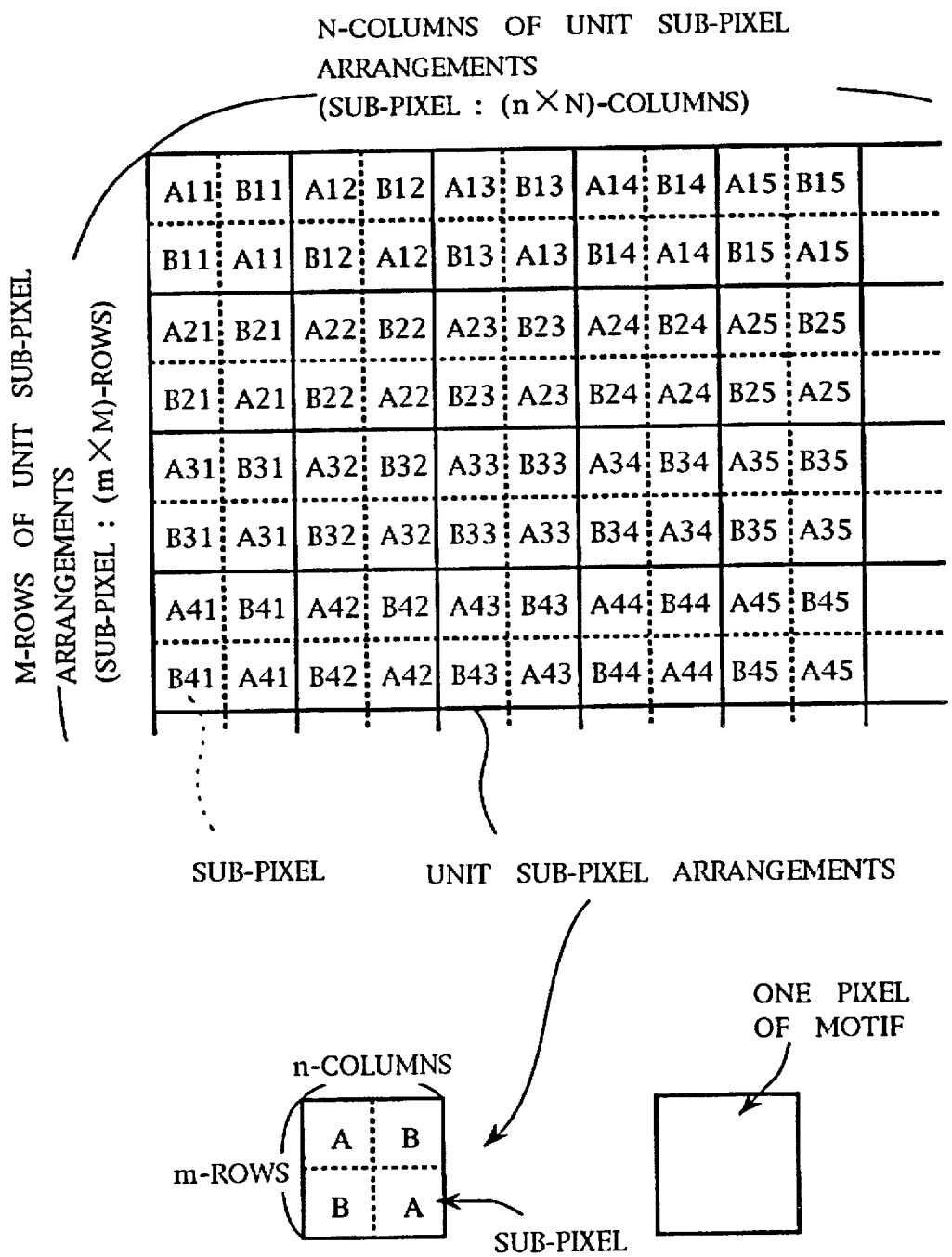
FIG. 27 is a view showing an example where motif A shown in FIG. 25 and motif B shown in FIG. 26 are represented by using sub-pixels in an overlapping manner.

In general, a correspondence relationship between individual pixels and individual sub-pixels in the case where the above-described technique is used will be briefly described. Let now consider the case where a motif A is represented by pixel arrangement of M rows by N columns as shown in FIG. 25 so that individual pixels are named A11, A12, . . . , and a motif B is similarly represented by pixel arrangement of M rows by N columns as shown in FIG. 26 so that individual pixels are named B11, B12, . . . In this case, as shown in FIG. 27, an arrangement of "unit sub-pixel arrangements" having M rows by N columns can be defined. It can also be said that this arrangement is a sub-pixel arrangement of (m×M) rows by (n×N) columns. At this time, a correspondence relationship between individual pixels shown in FIGS. 25 and 26 and individual sub-pixels shown in FIG. 27 is as shown (refer to names attached to individual pixels). In the embodiment shown in FIG. 27, the exactly same pixel is arranged in a left upper sub-pixel and a right lower sub-pixel within the same "unit sub-pixel arrangement", and the exactly same pixel is arranged in a left lower sub-pixel and a right upper sub-pixel within the same "unit sub-pixel arrangement" (e.g., when attention is drawn to the "unit sub-pixel arrangement" at first row and first column in FIG. 27, exactly the same pixel A11 is arranged in the left upper sub-pixel and the right lower sub-pixel, and exactly the same pixel B11 similarly arranged in the left lower sub-pixel and the right upper sub-pixels).

Figure 28:
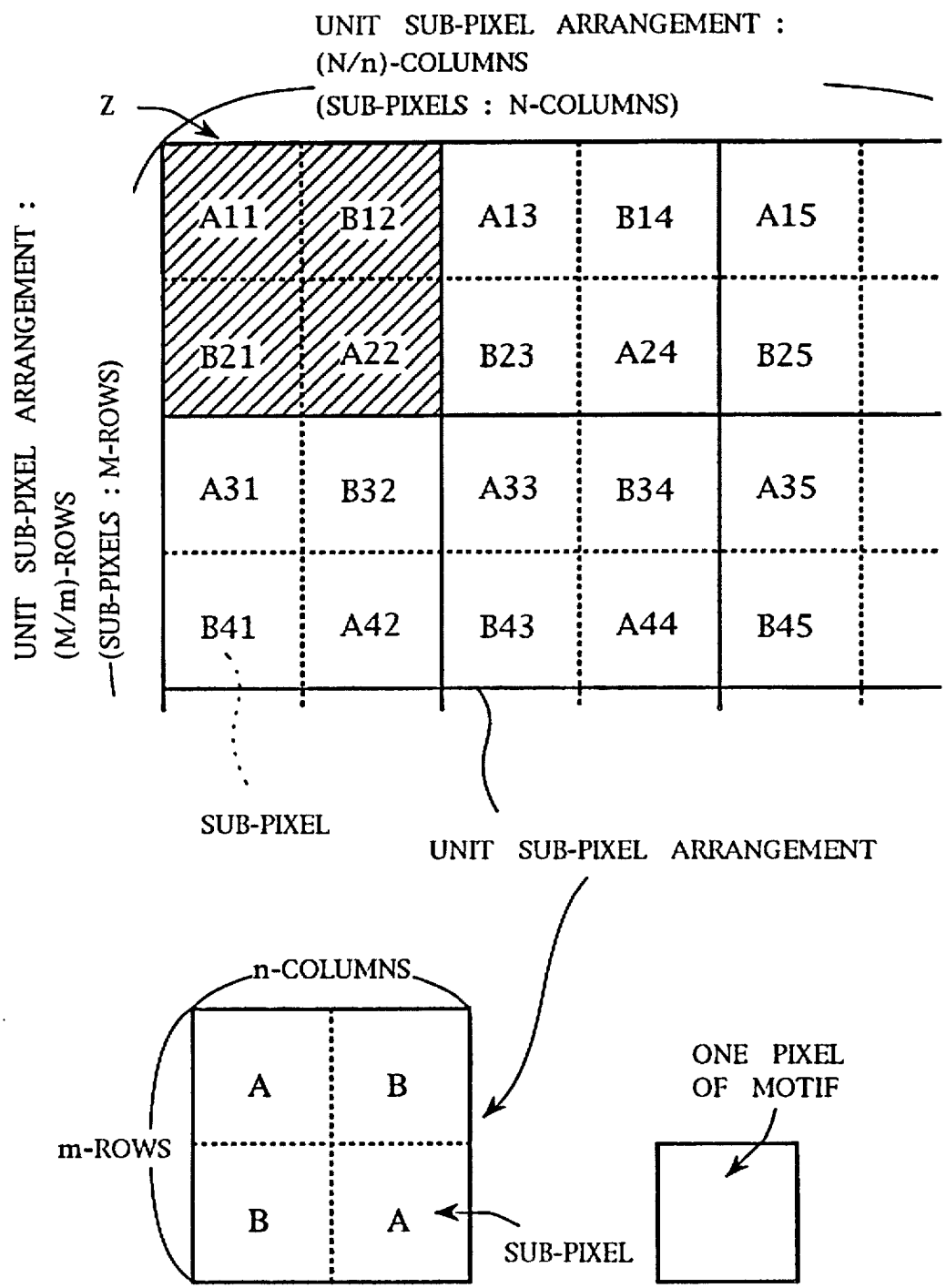
FIG. 28 is a view showing another example where motif A shown in FIG. 25 and motif B shown in FIG. 26 are represented by using sub-pixels in an overlapping manner.

On the contrary, a modification described below shows a method for allowing entirely different pixels to be arranged within a sub-pixel. In this modification, in place of "unit sub-pixel arrangement" shown in the bottom part of FIG. 27, "unit sub-pixel arrangement" shown in the bottom part of FIG. 28 is used. In these figures areas indicated by solid line serve as "unit sub-pixel arrangement", but those areas in both arrangements are different in dimension. Namely, in the example of FIG. 27, since a "unit sub-pixel arrangement" has the same dimensions as those of one pixel of a motif, a sub-pixel has dimensions which are one fourth of one pixel of the motif. On the contrary, in the example of FIG. 28, since a "unit sub-pixel arrangement" has dimensions corresponding to four pixels of a motif, a sub-pixel has the same dimensions as those of one pixel of the motif. Eventually, in the example of FIG. 28, in order to indicate the entirety of the motif, an arrangement of "unit sub-pixel arrangements" in a form of matrix of (M/m) rows by (N/n) columns should be defined. This arrangement is an arrangement of sub-pixels of M rows by N columns.

Let now consider what setting process of pixel pattern is carried out within a "unit sub-pixel arrangement Z (indicated by hatching in the figure) at the first row and the first column in FIG. 28. With respect to the motif A shown in FIG. 25, pixel patterns corresponding to pixels A11, A12, A21, A22 are picked up as setting candidates. On the other hand, with respect to the motif B shown in FIG. 26, pixel patterns corresponding to pixels B11, B12, B21, B22 are picked up as setting candidates. Thus, only one of the picked up pixel pattern is selected on the basis of sub-pixel constitutive information shown at the bottom part of FIG. 28 and the selected pattern is disposed at a predetermined sub-pixel position. In more practical sense, with respect to the motif A, only the pixels A11, A22 located at the left upper and the right lower positions among the picked up pixels A11, A12, A21, A22 are selected. On the other hand, with respect to the motif B, only the pixels B12, B21 located at the left lower and the right upper positions of the picked up pixels B11, B12, B21, B22 are selected. Thus, as indicated by the "unit sub-pixel arrangement Z" of FIG. 28, pixel patterns with respect to four pixels A11, B12, B21, A22 are set therein. Here, as seen if the entirety of the arrangement of "unit sub-pixel arrangements" shown in FIG. 28 is observed, the alternatives of pixels constituting the original motifs A and B are caused to undergo thinning. However, when motifs having a picture with considerably higher resolution, there is especially no problem even if such thinning is carried out.

In the technique shown in FIG. 27, pixels are not caused to undergo thinning, but dimensions of sub-pixels become finer than those of pixels of motif. On the contrary, in the technique shown in FIG. 28, dimensions of sub-pixels are the same as those of pixels of motif, but pixels are caused to undergo thinning. These techniques both have merits and demerits. Accordingly, by taking into consideration picture or resolution, etc. of motif actually used, either suitable technique may be adopted.

It is to be noted that, as described in §2, the "technique using a plurality of pixel patterns with respect to one motif" may be applied to the "embodiment representing a plurality of motifs in which pixels overlap with each other" in §4. For example, in the above-described example shown in FIG. 22, a pixel pattern having grating line arrangement angle of 45° is arranged with respect to sub-pixels corresponding to the motif A, and pixel pattern of grating line arrangement angle of 90° is arranged with respect to sub-pixels corresponding to the motif B. In other word, there are two pixel patterns are prepared and one pixel pattern is used for the motif A and another pixel pattern is used for the motif B. On the contrary, in the example shown in FIG. 29, five pixel patterns having grating line arrangement angles of 35°, 40°, 45°, 50°, 55° are prepared and arranged with respect to sub-pixels corresponding to the motif A, and another pixel pattern having grating line arrangement angle of 90° is prepared and arranged in a manner similar to the above-described is embodiment with respect to sub-pixels corresponding to the motif B. FIG. 30 is a view for assisting understanding of the embodiment shown in FIG. 29, i.e., a view showing grating line arrangement angle distribution of pixel patterns arranged at sub-pixels of the motif A. Namely, grating line arrangement angle values of pixel patterns are respectively indicated by numeric values at respective sub-pixel positions of the motif A. It is understood that five pixel patterns having grating line arrangement angles of 35°, 40°, 45°, 50°, 55° are arranged with respect to sub-pixels corresponding to the motif A.

Figure 29:
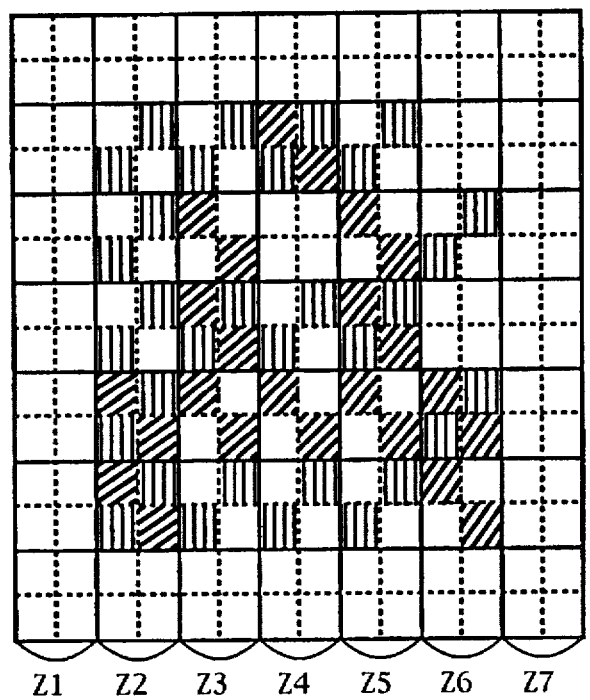
FIG. 29 is a view showing an embodiment in which a grating line angle of a sub-pixel for motif A is varied every respective areas in the diffraction grating recording medium shown in FIG. 22.
Figure 30:
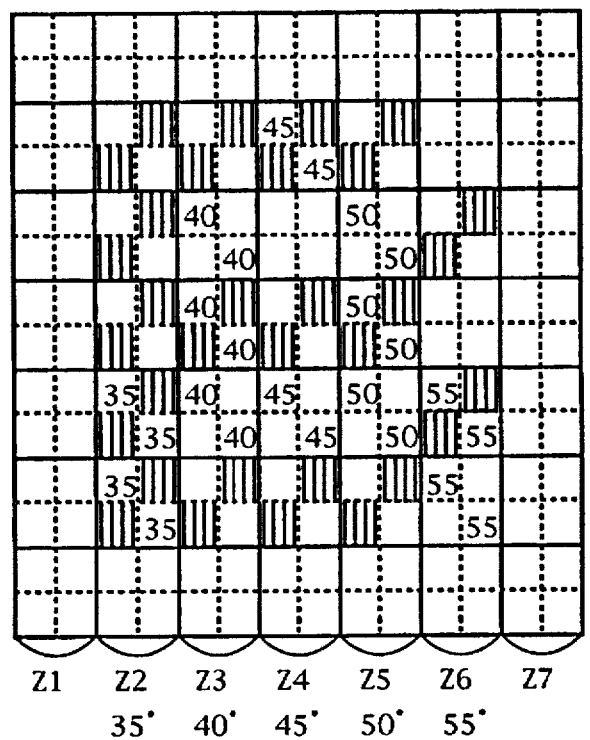
FIG. 30 is a view showing grating line angles of sub-pixels for motif A by using numeric values in the diffraction grating recording medium shown in FIG. 29.

The feature of the embodiment shown in FIG. 29 or FIG. 30 resides in that, with respect to the motif A, five pixel patterns are arranged so that the same pixel pattern is arranged within the same area. In more practical sense, elongated rectangular areas Z1 to Z7 are defined from the left toward the right of the figure. The pixel pattern having grating line arrangement angle of 35° is arranged in sub-pixels of the motif A within the rectangular area Z2; the pixel pattern having grating line arrangement angle of 40° is arranged in sub-pixels of the motif A within the rectangular area Z3, the pixel pattern having grating line arrangement angle of 45° is arranged in sub-pixels of the motif A within the rectangular area Z4; the pixel pattern having grating line arrangement angle of 50° is arranged in sub-pixels of the motif A within the rectangular area Z5; and the pixel pattern having grating line arrangement angle of 55° is arranged in sub-pixels of the motif A within the rectangular area Z6.

As stated above, when grating line arrangement angles of pixel patterns used in the motif A are varied by a predetermined width (±10°) with a predetermined angle (45°) being as center, and grating lines are arranged in such a manner that the angle value gradually changes according as the rectangular area position shifts from the left rectangular area to the right rectangular area, an additional effect is obtained such that light trace takes place in left and right directions when the motif A is observed. This is because since when this medium is observed in the state held by the hand, fluctuation takes place in the observation angle, the rectangular area observed to be most bright moves in left and right directions. Further, since pixel patterns having the same grating line arrangement angle are arranged (for example, all the pixel patterns with respect to the motif A within the rectangular area Z4 are the same pixel pattern having grating line arrangement angle of 40°), the entirety of the motif within that rectangular area is observed with shine at the same time. Thus, a bright motif can be observed in general.

While a plurality of pixel patterns are used for the purpose of representing the motif A in the above-described embodiment, a plurality of pixel patterns may be similarly used for the purpose of representing the motif B. For example, if a first group of plural pixel patterns whose angle falls within width of ±5° with 45° being as center are prepared and arranged with respect to the motif A, and a second group of plural pixel patterns whose angle falls within width of ±5° with 90° being as center are prepared and arranged with respect to the motif B, it is possible to discriminate between the motif A and the motif B at the time of observation. In addition, an effect leaving light trace can be added to both the motifs A, B. Although these center angles and widths can be freely set, it is preferable, in order that both the motifs A, B do not interfere with each other, to allow a center value (45° in the case of the above-described example) of grating line arrangement angle of pixel patterns used in the motif A and a center value (90° in the case of the above-described example) of grating line arrangement angle of pixel patterns used in the motif B to differ from each other at least more than 30°. In addition, it is preferable that a boundary value (50° in the case of the above-described example) on the motif B side of grating line arrangement angle of pixel patterns used in the motif A and a boundary value (85° in the case of the above-described example) on the motif A side of grating line arrangement angle of pixel patterns used in the motif B to differ from each other more than 30°.

It is to be noted that while plural pixel patterns are prepared by varying grating line arrangement angle in the above-described embodiment, it is sufficient for preparing plural pixel patterns different from each other by varying at least one of three parameters of an arrangement angle, a line width and a pitch of grating lines. Accordingly, even if a plurality of pixel patterns having different line widths of grating lines, or a plurality of pixel patterns having different pitches of grating lines are used, a peculiar effect can be obtained at the time of observation of the motif.

It is to be noted that while a rectangular shape is employed as a shape of pixels or sub-pixels in the previously described embodiments, a square pixel or sub-pixel (e.g., dimensions of 50 μm×50 μm) as shown in FIG. 31a or a circular pixel or sub-pixel as shown in FIG. 31b may be employed. It should be noted that it is preferable to employ rectangular pixels (rectangle or square) rather than circular pixels in the sense of improving formation density of a diffraction grating.

§5. Embodiment Representing Motif Having Gradation

While a process where a motif is given as a binary picture having no gradation has been described above, this invention may be applied to a half-tone motif. In the case of representing a half-tone motif, it is sufficient to prepare, e.g., a plurality of pixel patterns as shown in FIG. 32. Here, the area indicated by a solid line is a full occupation area V as a pixel and the area indicated by a broken line is a closed area W where grating lines are to be disposed. Five pixel patterns shown in FIG. 32 are such that area ratios of the closed area W to the full occupation area V are respectively 100%, 50%, 30%, 10% and 5%. It can be said that they are pixel patterns having density values different from each other. Accordingly, if an approach is employed to properly use pixel patterns having density values different from each other in dependency upon pixel values (density values) of respective pixels constituting the original motif, representation of half-tone motif can be made.

However, in such gradation picture representation method, there is the problem that the area where no diffraction grating is formed (area outside the closed area W) is not effectively utilized, so the entirety of picture becomes dark. Gradation representation method described below presents another technique for carrying out gradation representation in order to solve such problem.

The fundamental principle of this gradation representation method will be first described. Now, as shown in FIG. 33a, a diffraction grating plate K in which a large number of grating lines are arranged in a horizontal direction of the figure is prepared. Respective grating lines are arranged under the condition of line width d=about 0.6 μm and pitch p=about 1.2 μm. It is now assumed that an observer takes such diffraction grating plate K by his/her hand to hold it in such a manner that it stands vertically to observe it from horizontal direction (this corresponds to an observation from the upper point vertically from the surface plane of the page where the diffraction grating plate K is depicted). Namely, the observer observes it from a direction such that a line of sight intersects with the diffraction grating plate K in a direction perpendicular thereto. In this state, the diffraction grating plate K is rotated with the line of sight being as center of rotation. FIGS. 33b to 33e show the state where the diffraction grating plate K is rotated by 30°, 45°, 60°, 90° with the state shown in FIG. 33a being as 0°. When viewed from the observer, an arrangement angle of grating lines is varied by 0° to 90° by this rotation. When such observation is carried out, in ordinary illumination environment (outdoors or indoors where ordinary illumination is carried out), the state of arrangement angle of 0° as shown in FIG. 33a is observed to be most bright, and the state of arrangement angle of 90° as shown in FIG. 33e is observed to be most dark. Accordingly, when the observer holds the diffraction grating plate K in the state as shown in FIG. 33a and allow it to be in the state as shown in FIG. 33e while gradually rotating it in a clockwise direction, it is observed from the observer that the front surface of the diffraction grating plate K gradually becomes dark.

When this principle is applied to the above-described diffraction grating recording medium, representation of a half-tone motif can be made. For example, five pixel patterns P1 to P5 as shown in FIG. 34 are prepared. Here, respective pixel patterns P1 to P5 are diffraction grating patterns in which grating lines having the same line width are arranged at the same pitch, but arrangement angles of grating lines are different from each other in order of 0° to 90°. Accordingly, in accordance with the above-described principle, when these respective pixel patterns P1 to P5 are placed under the ordinary illumination environment and the observer holds it in a manner standing vertically and observes it from the horizontal direction, the pixel pattern P1 is observed to be most bright, and the pixel patterns P2 to P4 are observed in such a manner that they gradually become dark in order recited. In this case, the pixel pattern P5 is observed to be most dark. If these respective pixel patterns are caused to correspond to respective pixels in dependency upon density values thereof, representation of a half-tone motif can be made. For example, with respect to pixels in which density value C=0% (most bright) to 100% (most dark) is given, it is sufficient to allow any one of the pixel patterns P1 to P5 to correspond to respective pixels on the basis of the density value ranges as indicated on the lowest row of FIG. 34. Namely, with respect to pixels having a density value expressed as 0%≦C<20%, the pixel pattern P1 is caused to correspond to this respective pixels. With respect to pixels having a density value expressed as 20%≦C<40%, the pixel pattern P2 is caused to correspond to this respective pixels. With respect to pixels having a density value expressed as 40%≦C<60%, the pixel pattern P3 is caused to correspond to this respective pixels. With respect to pixels having a density value expressed as 60%≦C<80%, the pixel pattern P4 is caused to correspond to this respective pixels. With respect to pixels having a density value expressed as 80%≦C≦100%, the pixel pattern P5 is caused to correspond to this respective pixels.

The example in which this gradation representation method is applied to more practical motif is shown below. The previously described motif of FIG. 1a is a pattern indicating a character "A" of alphabet, but is a binary picture having no gradation. Each pixel has only either a pixel value of "0" or "1" as shown in FIG. 1b. On the contrary, let consider the motif where respective pixels have density value C of 0% to 100%. FIG. 35a shows density values of respective pixels for a picture indicating a character "A" of alphabet similarly to the motif of FIG. 1a, and is a picture having gradation. The background portion is comprised of pixels of density value C=5%, and the picture portion is comprised of pixels having any one of density values C=95%, 90%, 70%, 35% or 30%. When, with respect to respective pixels having these density values, five pixel patterns P1 to P5 are caused to correspond to respective pixels by the method shown in FIG. 34, correspondence relationship as shown in FIG. 35b is obtained. Thus, if respective pixel patterns are successively arranged at respective pixel positions on the basis of the correspondence relationship, picture "A" having gradation can be represented by diffraction gratings.

It is to be noted while, in the above-described embodiment, grating line arrangement angles of pixel patterns are distributed over a broad range of 0° to 90°, there is no necessity of distributing them in such a broad range from a practical point of view. In actual terms, when the grating line arrangement angle is caused to be varied in a range of 0° to 45°, it is possible to vary the brightness from bright state (0°) to considerably dark state (45°). Further, even if the grating line arrangement angle is varied in a range of 45° to 90°, brightness is not varied to much degree. Accordingly, it is sufficient that the range of grating line arrangement angle of 0° to 45° or the range of grating line arrangement angle of 0° to 30° is caused to correspond to the range of density value 0% to 100%.

Meanwhile, in the principle which has been described with reference to FIGS. 33a to 33e, in the ordinary illumination environment, pixel patterns having grating lines in horizontal direction are observed to be bright, and pixel patterns having grating lines in vertical direction are observed to be dark. For this reason, when the diffraction grating recording medium itself representing a gradation picture by the above-described method is rotated by 90° and is observed, the relationship between darkness and brightness is reversed. This will be explained by using an actual example. It is now assumed that pixel patterns are arranged by using correspondence relationship as shown in FIG. 35b with respect to a gradation picture having density values as shown in FIG. 35a, whereby recording medium M as shown in FIG. 36a is obtained. When observing this recording medium M in the state where it is held longitudinally as shown in FIG. 36a, a scheduled bright and dark state is obtained. Namely, in FIG. 35a, pixels having density value 5% (grating line is caused to be in horizontal direction) becomes most bright (white) pixel, and pixels of density value 95% (grating line is caused to be vertical) becomes most dark (black) pixel. Meanwhile, when observing this recording medium M in the state where it is held in a lateral state as shown in FIG. 36b, the relationship between dark and bright states is reversed. When an original picture is caused to be a positive picture, a negative picture is observed. Namely, pixels of density value 5% (grating lines are caused to be vertical in turn) are the most dark (black) pixel, and pixels of density value 95% (grating lines are caused to be horizontal in turn) are the most bright (white) pixel.

Figure 37A:
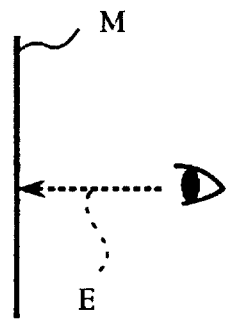
FIGS. 37a, 37b are views for explaining that a reversal phenomenon of negative/positive takes place by angles of observation in the diffraction grating recording medium according to this invention.
Figure 37B:
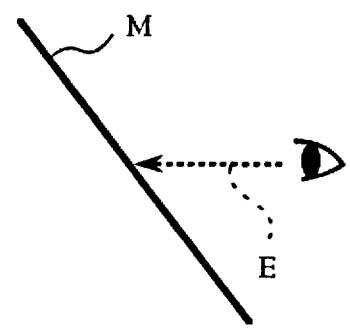

Moreover, such reversal of negative/positive takes place also by varying an angle that a line of sight and recording medium M form. Discussion has been made in connection with the case where observation is made from a direction in which the line of sight E is vertical to the surface of the recording medium M as shown in FIG. 37a. Also in the case where the recording medium M is inclined relative to the line of sight E as shown in FIG. 37b, reversal of negative/positive takes place. FIG. 37b shows inclination in a longitudinal direction (inclination in a direction to allow the upper side of the recording medium M to be away from the observer, and to allow the lower side to become close to the observer, or direction opposite thereto). Similar phenomenon takes place even in inclination in a lateral direction (inclination to allow the right side of the recording medium M to be away from the observer and to allow the left side to become closer to the observer, or direction opposite thereto). Alternatively, even by illumination environment, there is the possibility that reversal of negative/positive may take place. In addition, it cannot be said that this phenomenon necessarily appears as reversal of positive/negative. When observing in improper direction or at improper angle, any pictures in which densities are complicatedly mixed may be observed with respect to the original motif. In short, in the case of representing a gradation picture on a recording medium M by this invention, there is the possibility that primary gradation picture cannot be correctly observed by holding state, observation angle and illumination environment of recording medium M by the observer.

However, this is not problem from a practical point of view. For example, it is now assumed that this recording medium M is formed on a credit card for prevention of forgery. In the case of confirming items described on the credit card, the observer ordinarily holds credit card in a correct direction on the front side as shown in FIG. 37a. As long as the observer observes the credit card in this manner, a picture having gradation as in the ordinary motif can be observed. Even if the observer observes the credit card in a holding state with horizontal and vertical directions being opposite to each other, or observes it in an inclined manner, there particularly takes place no problem from a practical point view. In this case, when consideration is made with the original motif being as reference, gradation information is not certainly correctly reproduced. However, since such a pseudo hologram seal does not aim at faithfully reproducing an object like photograph, there is no problem by any means from a practical point of view. Since densities of respective portions are variously changed by varying observation angle or direction, this is a preferable phenomenon from viewpoint of the fact that a fantastic image is given.

§6. Embodiment Representing A Plurality Of Motifs Having Gradation

The gradation representation method described above can be applied also in the case of displaying a plurality of motifs in an overlapping manner described in §3 and §4. The motifs A, B shown in FIGS. 15a, 15b are both binary pictures having no gradation. On the other hand, in the case where they are gradation pictures, it is sufficient to carry out handling described below. Namely, a plurality of pixel patterns having grating line arrangement angles similar to each other are prepared as one group and plural groups of pixel patterns are defined. Then the respective groups of pixel patterns are caused to correspond to the respective motifs. For example, with respect to the motif A, a plurality of pixel patterns having a grating line arrangement angle in the vicinity of angle of 0° are defined. With respect to the motif B, a plurality of pixel patterns having a grating line arrangement angle in the vicinity of angle of 90° are defined. In more practical sense, with respect to sub-pixels used in the motif A, plural pixel patterns having a grating line arrangement angle in the range of angle of −5° to +5° are defined, and with respect to sub-pixels used in the motif B, plural pixel patterns having a grating line arrangement angle in the range of angle of 85° to 95° are defined. Since there is large difference between an observable angle in the pixel pattern group having grating line arrangement angle in the vicinity of angle of 0° and that in the pixel pattern group having a grating line arrangement angle in the vicinity of angle of 90°, when medium recorded by such a method is observed from a specific direction and angle, the motif A is observed. When observed from a different specific direction and angle, the motif B is observed. In addition, since there is a difference between grating line arrangement angles within range of angle of −5° to +5° in dependency upon respective sub-pixels, when the motif A is being observed, density differences are observed between individual sub-pixels. Similarly, since there is a difference between grating line arrangement angles within the range of angle of 85° to 95° in dependency upon respective sub-pixels, when the motif B is being observed, density differences are similarly observed between individual sub-pixels. Thus, it is possible to display a plurality of motifs respectively having gradations in an overlapping manner.

It is to be noted that the method based on the first approach of this invention is not limited to these embodiments, but may be carried out in various forms. While, in the above-described embodiment, for example, with respect to grating line arrangement angle of pixel patterns used for the motif A, width of ±5° is set with 0° being as center. With respect to grating line arrangement angle of pixel patterns used for the motif B, width of ±5° is set with 90° being as center. However, it is possible to freely set the center angle and the width. It should be noted that, in order to allow the motif A and the motif B to interfere with each other, it is preferable to allow a center value of grating line arrangement angle of pixel patterns used for the motif A (0° in the case of the above-described example), and a center value of grating line arrangement angle of pixel patterns used for the motif B to be different more than at least 30°. Moreover, it is preferable to allow a boundary value on the motif B side of grating line arrangement angle of pixel patterns used for the motif A (+5° in the case of the above-described example), and a boundary value on the motif A side of grating line arrangement angle of pixel patterns used for the motif B (85° in the above-described case) to be different more than at least 30°. It is to be noted that since pixels having grating line arrangement angle of 0° are observed to be the brightest, if it is desired to make the motif A the brightest, it is prefer to prepare a group of pixel patterns having a grating line arrangement angle ranged in ±5° with 5° being as center, in other word, pixel patterns distributed in the range of grating line arrangement angle of 0° to 10° to represent the motif A by using this pixel patterns.

Figure 38:
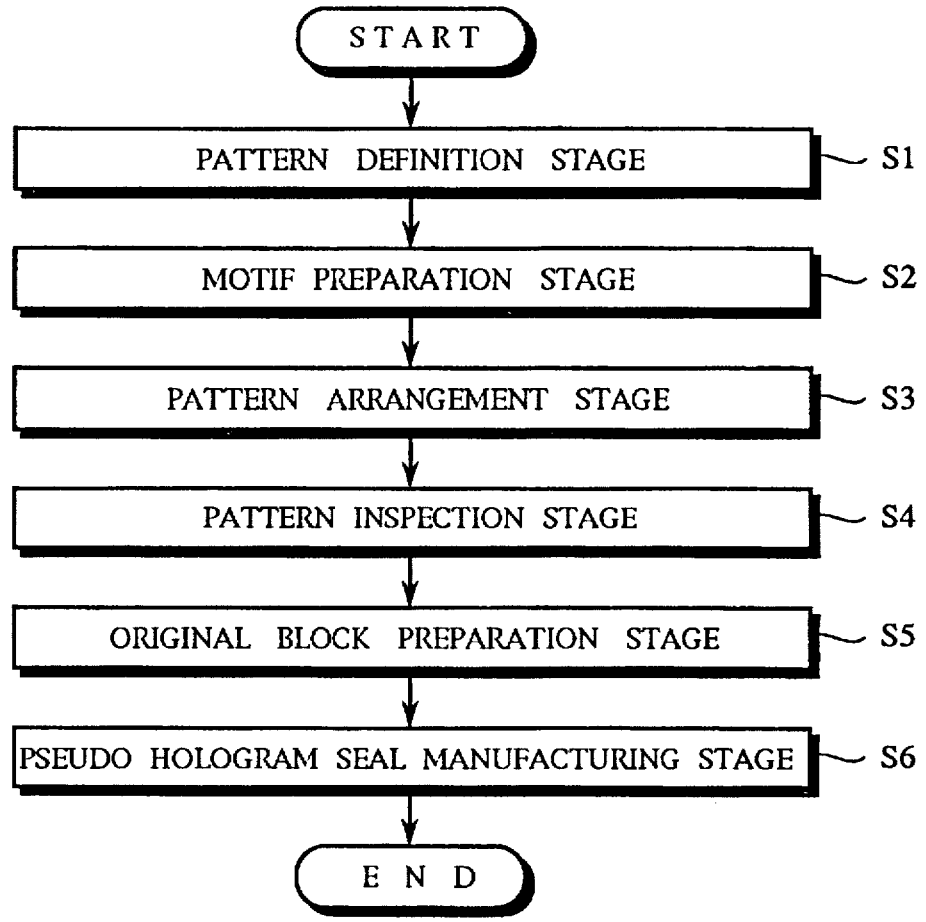
FIG. 38 is a flowchart showing a procedure of a method of preparing a diffraction grating recording medium according to the embodiment of this invention.

§7. Method Of Preparing Diffraction Grating Recording Medium According To This Invention The procedure of methods of preparing the above-described various diffraction grating recording media will now be described in accordance with the flowchart of FIG. 38. This procedure is composed of sixth stages of steps S1 to S6. More particularly, steps S1 to S4 are executed by computer and peripheral equipments thereof, step S5 is executed by electron beam picture drawing apparatus, and step S6 is executed by printer.

The pattern definition stage of step S1 is the stage for defining a plurality of pixel patterns in which grating lines having a predetermined width are arranged within a predetermined closed area at a predetermined pitch. Respective pixel patterns defined here have arrangement angles of grating lines different from each other like patterns P1 to P5 of FIG. 5, for example. The number of pixel patterns to be defined may be suitably determined in dependency upon form of a recording medium to be prepared. For example, in the case of representing a half-tone motif, it is sufficient to determine the number of pixel patterns to be prepared in dependency upon the number of stages by which a density value of the motif is divided. While, in the example of FIG. 34, a density value of 0% to 100% is divided into five stages and five pixel patterns P1 to P5 are prepared, it is possible to allow pitch of arrangement angle of grating line to be more fine to define more pixel patterns if more fine division is made.

The motif preparation stage of step S2 is the stage for preparing motif pixel information. Here, motif pixel information is information in which a plurality of pixels having predetermined density values are defined at predetermined positions on the plane in the case where a predetermined half-tone motif is represented. For example, information as shown in FIG. 35a is motif pixel information. For preparing such motif pixel information, there are various methods. If, e.g., a photographic manuscript or an illustration manuscript that a designer depicts is read in as a picture data having gradation by a scanner device, it is possible to utilize it as motif pixel information. Alternatively, if there is employed a method of operating a graphic application software on computer to draw such a gradation picture, it is possible to prepare the motif pixel information.

The pattern arrangement stage of step S3 is the stage for allowing individual pixel patterns to correspond to respective pixels on the basis of respective density values in the motif pixel information to dispose corresponding pixel patterns at respective pixel positions. For example, if the pixel patterns P1 to P5 are caused to correspond to respective pixels shown in FIG. 35a in accordance with the condition defined by the equations indicated at the bottom line of FIG. 34, a correspondence relationship as shown in FIG. 35b is obtained. Subsequently, the actual pixel patterns P1 to P5 are arranged at respective pixel positions on the basis of this correspondence relationship. The process described above is executed as a layout (allocation) process within computer.

The pattern inspection stage of step S4 is the stage for inspecting whether or not the pattern arrangement is correctly carried out in the pattern arrangement stage of step S3.

Namely, a peculiar display mode on a display screen is determined with respect to respective plural pixel patterns defined in step S1 so as to display individual pixel patterns disposed on the display screen by the peculiar display mode. As previously described, since an actual pixel pattern is a fine pattern having line width or pitch of the order of 1 µm, it is impossible to display it on the display screen in the state as it is. In view of this, a peculiar display mode is determined with respect to respective pixel patterns in order to permit the operator to visually grasp individual pixel patterns on the display screen. As this display mode, there may be employed any display mode capable of discriminating between individual pixel patterns. In this embodiment, a width of each actual grating line is expanded to such an degree that the observer can observe it by the naked eye, and the number of grating lines are thinned so that the pitch thereof can be expanded to such an extent that the observer can observe them by the naked eye, thus to display respective pixel patterns on the display screen (pixel patterns in the figures which have been shown until now are in reality indicated in a mode such that the observer can observe it by the naked eye in this way).

Figure 39:
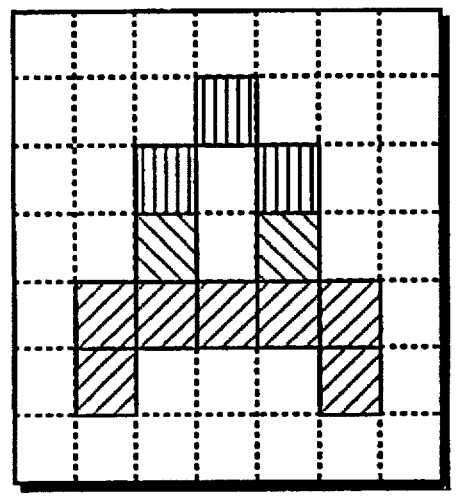
FIG. 39 is a view showing a display example in the case where a limitation by grating line arrangement angle is given to pixel patterns displayed on a display screen in step S4 (pattern inspection stage) of the flowchart shown in FIG. 38.

However, with this method, grasp of form of motif becomes difficult. For example, in the case of picture having density values as shown in FIG. 35a, bright and dark areas can be clearly discriminated on an actual diffraction grating seal. For this reason, recognition of the motif comprised of alphabet character of "A" can be made. However, at the pattern inspection stage of step S4, since respective pixel patterns shown in FIG. 34 are displayed in a mosaic form on the display screen, it is difficult to grasp the motif of alphabet character of "A" by difference between arrangement angles of grating lines. In view of this, in this embodiment, at the pattern inspection stage, such a function to display, on the display screen, only pixel patterns where arrangement angle of grating line falls within a predetermined range is added. For example, in the case of the above-described example, if only pixel patterns in which a grating line arrangement angle is more than 30° is displayed, only pixel patterns P2, P4, P5 are displayed on the display screen as shown in FIG. 39, thus making it possible to easily grasp the form of the motif. Such a display function is convenient particularly in the case where a plurality of motifs are included as shown in FIG. 22. Namely, in the case of FIG. 22, if only pixel patterns having a grating line arrangement angle in the vicinity of angle of 45° are displayed, it is possible to recognize only the motif A as shown in FIG. 21a. Further, if only pixel pattern having a grating line arrangement angle in the vicinity of 90° is displayed, it is possible to recognize only the motif B as shown in FIG. 21b.

Further, display luminance of a pixel pattern on the display screen may be varied in dependency upon an arrangement angle of grating line. For example, in the case of the above-described example, if luminance with respect to pixel patterns in which grating line arrangement angle is less than 30° is lowered, display luminance of the pixel pattern P1 becomes dark, thus making it possible to similarly easily grasp the form of the motif. Alternatively, it is possible to display a group of pixel patterns in which grating line arrangement angle falls within a predetermined range at a same time and display a plurality of groups in a time divisional manner. For example, in the case of the above-described example, an approach may be employed to display only pixel patterns having a grating line arrangement angle more than 60° at a same time, thereafter to subsequently display only pixel patterns of 30° to 60° at a same time.

Respective processes up to the above-described step are executed by computer. Finally, picture data comprised of a set of pixel patterns can be prepared. At the subsequent step S5, preparation of an original block is carried out on the basis of this picture data. In this embodiment, a diffraction grating original block comprised of a fine pixel pattern arrangement is prepared by using electron beam picture drawing apparatus on the basis of the picture data thus obtained. When the original block is prepared in this way, pseudo hologram seals are manufactured at the subsequent step S6. In this embodiment, the original block is used to transfer an uneven pattern thereof onto a roll of film by using the technique of printing, thus to prepare pseudo hologram seals.

§8. Example Of The Configuration Of Practical Apparatus

Figure 40:
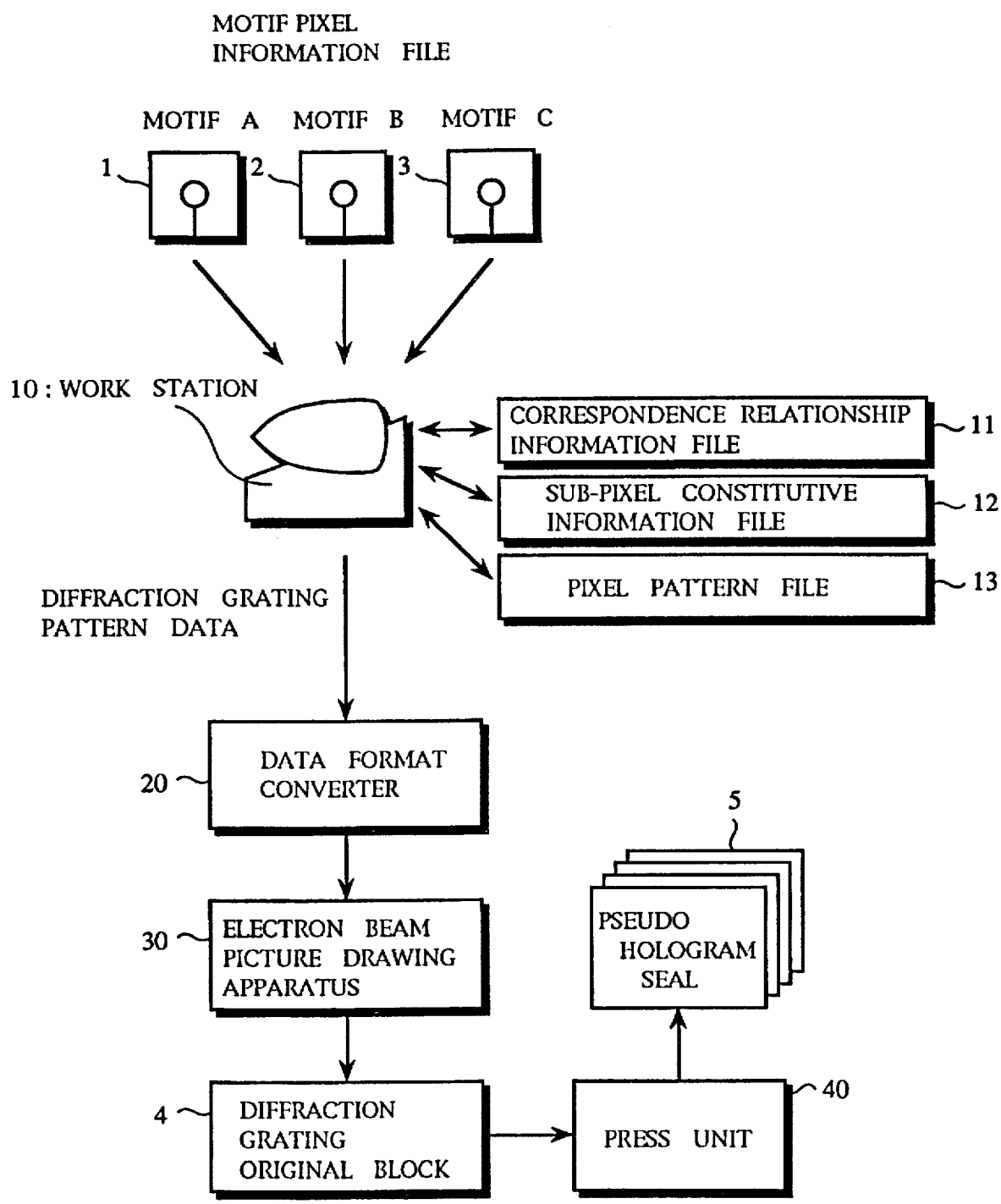
FIG. 40 is a block diagram showing an example of a configuration of an apparatus for carrying out a method of preparing a diffraction grating recording medium according to this invention.

An example of a configuration of an actual apparatus for carrying out the above-described method for preparing a diffraction grating recording medium is shown in FIG. 40. This apparatus includes, as the fundamental components, work station 10, data format converter 20, electron beam picture drawing apparatus 30, and press unit 40. The work station 10 is a computer in which program for carrying out the above-described various operation processes is assembled, and includes an input equipment such as a key board or a mouse, etc., an output equipment such as a display or a printer, etc., an external storage unit such as a floppy disk drive unit or a hard disk drive unit, and the like. There is shown the state where motif pixel information with respect to three motifs A, B, C are delivered to the work station 10 respectively by the floppy disks 1, 2, 3. As stated above, as motif pixel information (raster pixel data), information prepared by another picture drawing apparatus may be inputted to the work station 10. Alternatively, a design picture depicted on a paper may be inputted to the work station 10 by a scanner unit, or such information may be prepared by the work station 10 itself by using a picture drawing software stored in the work station 10.

Subsequently, the work station 10 is used to prepare correspondence relationship information based on the inputted motif pixel information which are preserved as a correspondence relationship information file 11. Moreover, sub-pixel constitutive information is defined and preserved as a sub-pixel constitutive information file 12. Further, necessary pixel patterns are prepared and preserved as a pixel pattern file 13. An operator inputs an instruction to the work station 10 in an interactive manner, thereby making it possible to prepare these files. If these files are prepared, the work station 10 carries out a process for setting a predetermined pixel pattern within the pixel pattern file 13 at a predetermined pixel position while retrieving and referring the correspondence relationship information file 11 and the sub-pixel constitutive information file 12, thus to output a diffraction grating pattern data.

This diffraction grating pattern data is given to the data format converter 20. This data format converter 20 is a device having a function to convert a diffraction grating pattern data that the work station 10 outputs into a format that the electron beam picture drawing apparatus 30 requires. The format converted data is given to the electron beam picture drawing apparatus 30. Thus, a diffraction grating pattern is outputted as a physical pattern onto a diffraction grating original block 4. The press device 40 is a device for pressing the diffraction grating pattern onto film by using the diffraction grating original block 4. By this device, pseudo hologram seals 5 are mass-produced.

Figure 41:
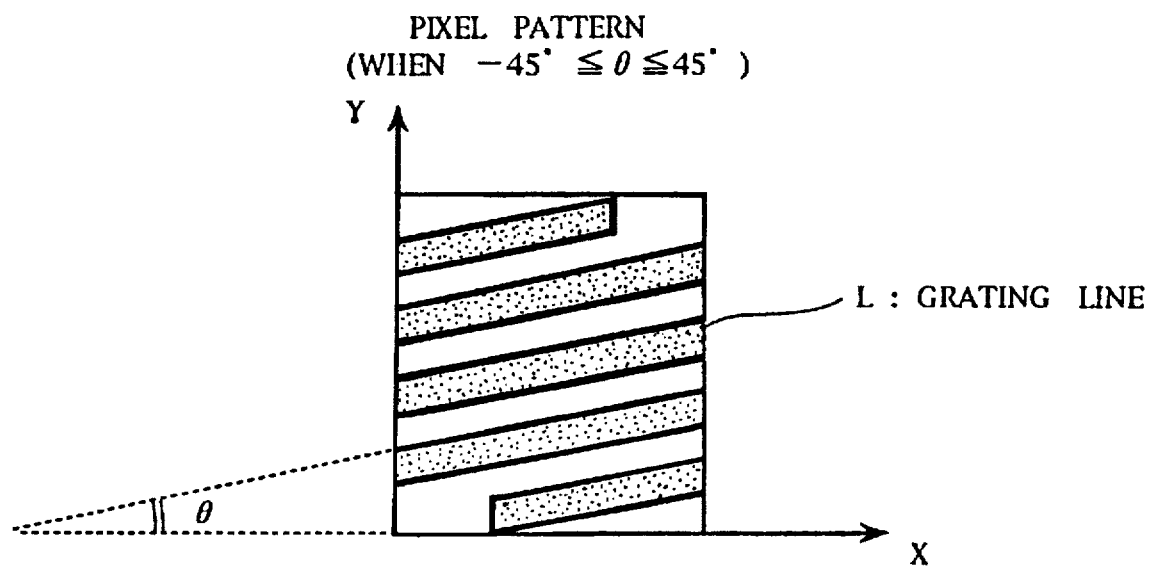
FIG. 41 is a view showing a first example of a pixel pattern suitable for describing grating lines by using an electron beam picture drawing apparatus.
Figure 42:
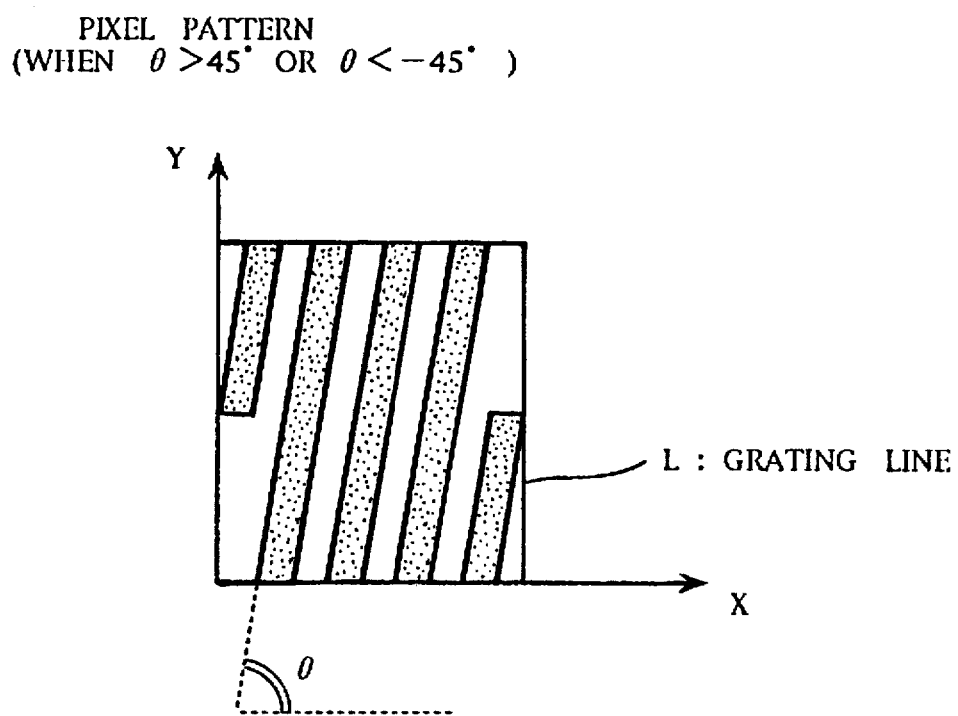
FIG. 42 is a view showing a second example of a pixel pattern suitable for drawing grating lines by using an electron beam picket drawing apparatus.

It is to be noted that, in the pixel pattern shown in FIG. 2, respective grating lines L take an arbitrary square shape. If a general device commercially available for preparation of a photo mask is used as an electron beam picture drawing apparatus 30, it is preferable to use grating lines L in the form of parallelogram in which opposite sides are in parallel to X-axis or Y-axis. For example, in the case where an arrangement angle θ of grating lines L is expressed as $-45°≦θ≦45°$, grating lines L in which short sides are in parallel to Y-axis is preferably used as shown in FIG. 41. On the other hand, in the case where an arrangement angle θ of grating lines L is expressed as $θ>45°$ or $θ<-45°$, grating lines L in which short sides are in parallel to X-axis is preferably used as shown in FIG. 42. As stated above, when a parallelogram in which opposite sides are in parallel to X-axis or Y-axis is used, picture drawing efficiency in the electron beam picture drawing apparatus for preparing a photo-mask is improved.

§9. Fundamental Embodiment Based On The Second Approach

Figure 43:
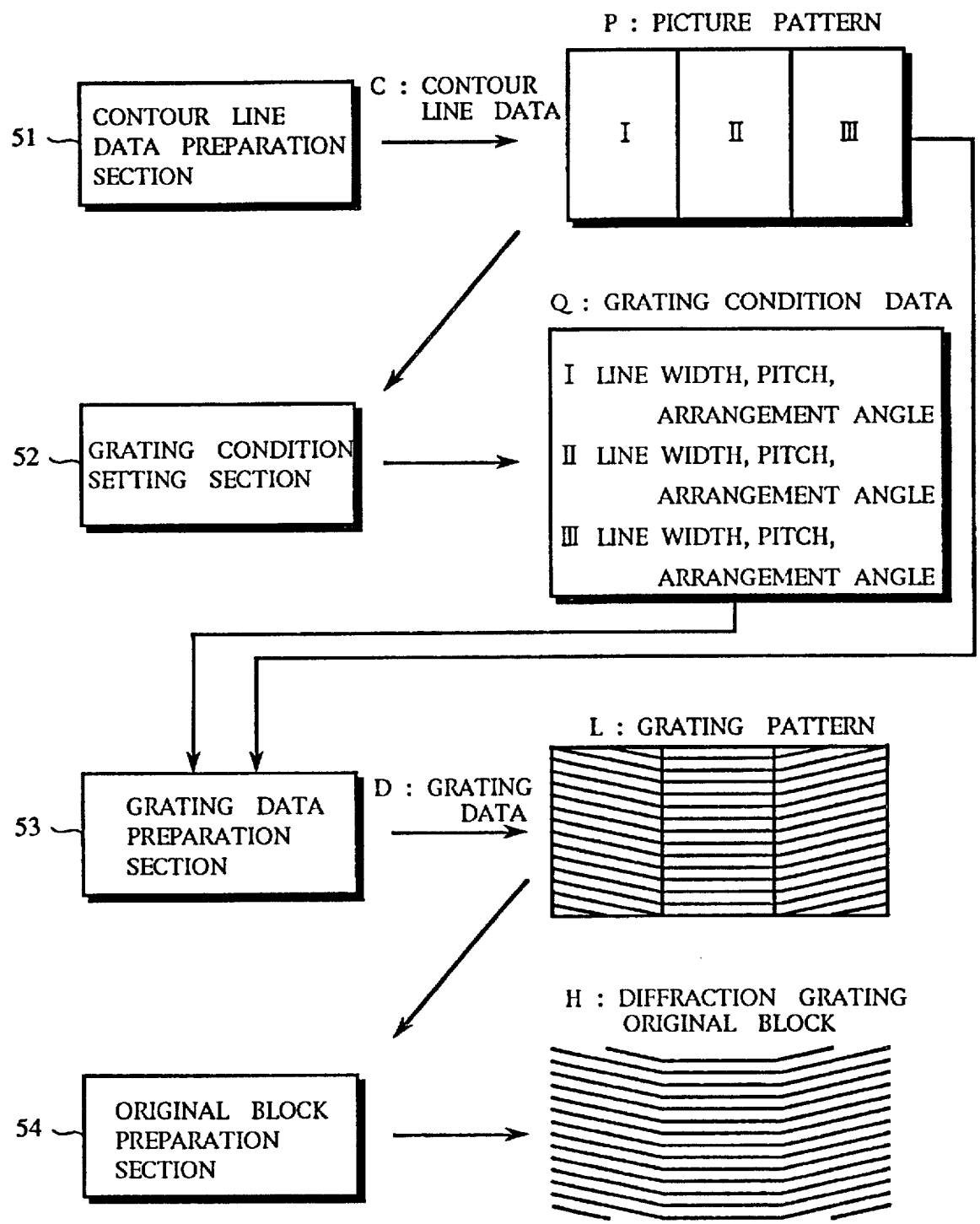
FIG. 43 is a block diagram showing a fundamental configuration of an apparatus for preparing a diffraction grating recording medium according to the second approach of this invention.

Subsequently, a diffraction grating recording medium according to the second approach of this invention will be described in accordance with the embodiment. FIG. 43 is a block diagram showing the fundamental configuration of an apparatus for preparing an original block of such a recording medium. This apparatus includes, as the fundamental components, contour line data preparation section 51, grating condition setting section 52, grating data preparation section 53, and original block preparation section 54. Patterns, etc. indicated on the right side of respective blocks are conceptual views showing data prepared by the respective sections.

The contour line data preparation section 51 has a function to represent a picture pattern having a plurality of closed areas by contour lines of the respective closed areas to prepare a contour line data indicating the contour lines. In more practical sense, a picture drawing device generally used (e.g., a personal computer in which a picture drawing program is stored) may be used as the contour line data preparation section 51. A picture pattern prepared here is represented as a motif in a final diffraction grating original block. As a picture pattern prepared by a general picture drawing device, there are two types of data forms when roughly classified. The first type is a data form generally called "draw form" in which a contour line is represented by vector data. The second type is a data form called "paint form" in which the entirety of pattern is represented by raster data. In this invention, a picture drawing device (CAD device) capable of carrying out preparation of a picture in "draw form" is used. Namely, a picture pattern thus prepared is represented by contour line data. Since various kinds of picture drawing devices having such function are known, detailed explanation is omitted here. It is to be noted that if a scanner device is used as the contour line data preparation section 51, it is possible to take thereinto a picture pattern depicted on paper.

In the example shown in FIG. 43, a simple picture pattern P comprised of three closed areas I, II, III is prepared. The contour line data preparation section 51 outputs such a picture pattern P in the form of a contour line data C. It is to be noted that, in this embodiment, in order to have ability of efficiently carrying out subsequent operation processes, curved portions of a contour line of a picture are approximated by fine linear lines, and respective linear lines are represented by vector data. Some picture drawing apparatuses have a function to prepare a picture data consisting of linear lines and curves (e.g., Vezier curve). If the prepared picture data contains such curves, it is preferable to approximate these curves to linear lines.

The grating condition setting section 52 has a function to set a line width, a pitch and an arrangement angle of grating lines constituting diffraction grating on the basis of the instruction inputted from the operator with respect to respective closed areas specified by contour line data prepared by the contour line data preparation section 51 and output them as grating condition data. For example, in the case where the picture pattern P comprised of the three closed area I, II, III is specified by the contour line data C as shown in FIG. 43, data indicating line width, pitch and arrangement angle of grating lines are set with respect to the respective three closed areas I, II, III is outputted as a grating condition data Q. This grating condition data Q is set on the basis of the instruction inputted from the operator. The grating condition setting section 52 is realized, from a practical point of view, by assembling a predetermined program into a personal computer or a work station. The apparatus in this embodiment is of a structure capable of displaying the picture pattern P having the closed areas I, II, III on a display on the basis of the given contour line data C and inputting a grating condition data Q when the operator designates a closed area to be set by using an input equipment such as a mouse or a keyboard, etc. However, it is not necessarily required to input all of grating condition data comprised of line width, pitch and arrangement angle of grating line by the operator. For example, if setting is made such that line width of grating line is the same as pitch, input of line width is unnecessary. In addition, if line width and/or pitch are fixed to respective specific values, there is no necessity of respectively inputting them.

The grating data preparation section 53 has a function to generate a grating pattern in which grating lines of a predetermined width are arranged at a predetermined pitch and at a predetermined angle within the respective closed areas of the picture pattern on the basis of the contour line data prepared by the contour line data preparation section 51 and the grating condition data prepared by the grating condition setting section 52 to prepare grating data indicating a grating pattern. In the example shown in FIG. 43, the grating data D corresponding to the grating pattern L is prepared on the basis of the contour line data C and the grating condition data Q. Here, there is shown the example where a line width and a pitch of grating lines are fixed and only an arrangement angle thereof is varied with respect to the three closed areas I, II, III. This grating data preparation section 53 can be realized, from a practical point of view, by assembling a predetermined program into a personal computer or a work station. In the apparatus of this embodiment, the grating condition setting section 52 and the grating data preparation section 53 are constituted by the same equipment as hardware. It is to be noted that, in short, as long as a picture data capable of representing a grating pattern L is employed, either picture data in the raster form or in the vector form may be employed. It should be noted that if subsequent process for delivering grating data D to the original block preparation section 54 is taken into consideration, it is preferable to prepare in advance the grating data D described by a format that the original block preparation section 54 can handle.

The original block preparation section 54 is the device having a function to form a grating pattern on a physical original block on the basis of the grating data prepared by the grating data preparation section 53. In the example of FIG. 43, a diffraction grating original block H in which a pattern corresponding to the grating pattern L is physically formed is obtained. In this embodiment, a charged particle beam picture drawing apparatus is used as the original block preparation section 54. In more practical sense, an electron beam picture drawing apparatus for preparing a photo-mask is used. Since a line width or a pitch of grating lines on the grating pattern L is a very small value (e.g., about 1 μm) sufficient to produce diffraction phenomenon, an electron beam picture drawing apparatus is very suitable for generating such fine pattern. However, this original block preparation section 54 is not limited to such an apparatus. For example, there may be employed a method for outputting an enlarged image of the grating pattern L onto a sheet of film by means of a printer, etc. thereafter to contract it by optical method, thus to obtain a diffraction grating original block.

As stated above, in the method according to this invention, it is possible to carry out the processes up to the stage for preparing the grating data D corresponding to the grating pattern L by computer. Further, since a physical diffraction grating is formed on a diffraction grating original block H on the basis of this grating data D, reproducibility becomes very satisfactory. Namely, if the same grating data D is used, it is possible to obtain substantially the same diffraction grating original block H. In addition, since an image on a diffraction grating original block is not an interference fringe image optically formed, but is a diffraction grating pattern generated by computer, the image becomes very clear.

§10. Embodiment Using Multiple Loop

Figure 44:
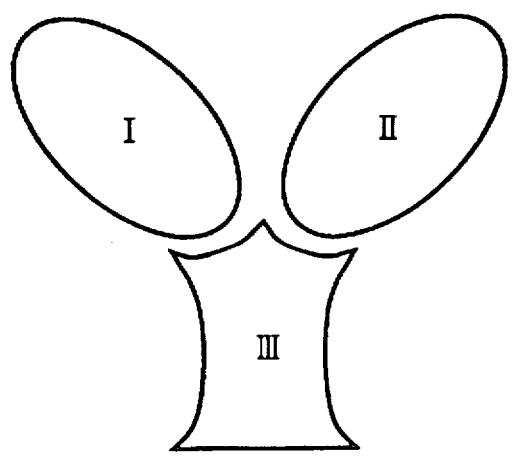
FIG. 44 is a view showing an example of a motif serving as basis of a pseudo diffraction grating pattern.
Figure 45:
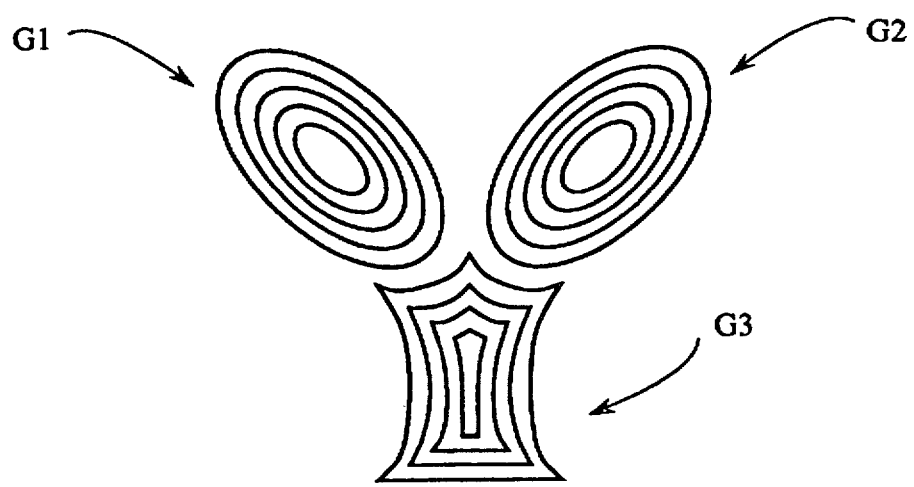
FIG. 45 is a view showing a picture pattern obtained by representing the motif shown in FIG. 44 by using multiple loop.

Subsequently, the operation of the apparatus shown in FIG. 43 will be described in detail on the basis of the example using an actual picture pattern. Let now consider the case where a diffraction grating original block is prepared on the basis of a motif as shown in FIG. 44. The motif shown in FIG. 44 is a relatively simple motif comprised of three closed areas I, II, III. Of course, it is possible to use such simple motif as a picture pattern as it is. In this case, grating patterns are respectively generated within the three closed areas I, II, III similarly to the example shown in FIG. 43. However, it is preferable to use a picture pattern as complex as possible as a pseudo hologram seal for prevention of forgery. In view of this, in this embodiment, a method of forming a picture pattern by multiple loops is adopted. Namely, with respect to the motif as shown in FIG. 44, a picture pattern as shown in FIG. 45 is used. This picture pattern can be divided into three groups G1, G2, G3. These groups respectively correspond to the closed areas I, II, III in the motif shown in FIG. 44. It is to be noted that the motif of FIG. 44 represents a picture by single contour lines, whereas the pattern of FIG. 45 represents a picture by multiple loops.

When such a picture representation by multiple loops is adopted, it is possible to increase the number of closed areas. As a result, the pattern can become complicated. For example, in accordance with the picture pattern of FIG. 45, five closed areas are respectively formed by quintuple loops at the portions of groups G1, G2, and four closed areas are formed by quadruple loops at the portion of group G3. Thus, fourteen closed areas in total are formed, and it becomes possible to handle the areas encompassed by the inner most loop or the areas between two adjacent loops as a single closed area. Accordingly, if different grating patterns are mapped onto every respective closed areas, it is possible to generate a considerably complicated pseudo hologram image. The work for preparing such a picture pattern comprised of multiple loops is relatively simple. Namely, it is sufficient to carry out the work for initially preparing a fundamental motif as shown in FIG. 44, and successively arranging and nesting a contracted loop inside a loop of every portions of respective closed areas.

The following explanation is continued on the premise that a picture pattern comprised of multiple loops as shown in FIG. 45 is prepared in the contour line data preparation section 51. It should be noted that the picture pattern comprised of multiple loops is such that a loop itself constitutes a contour line, and a curved portion is approximated by set of fine linear lines as previously described. Eventually, the contour line data C outputted from the contour line data preparation section 51 represents these individual loops as a vector data with linear approximation.

Figure 46:
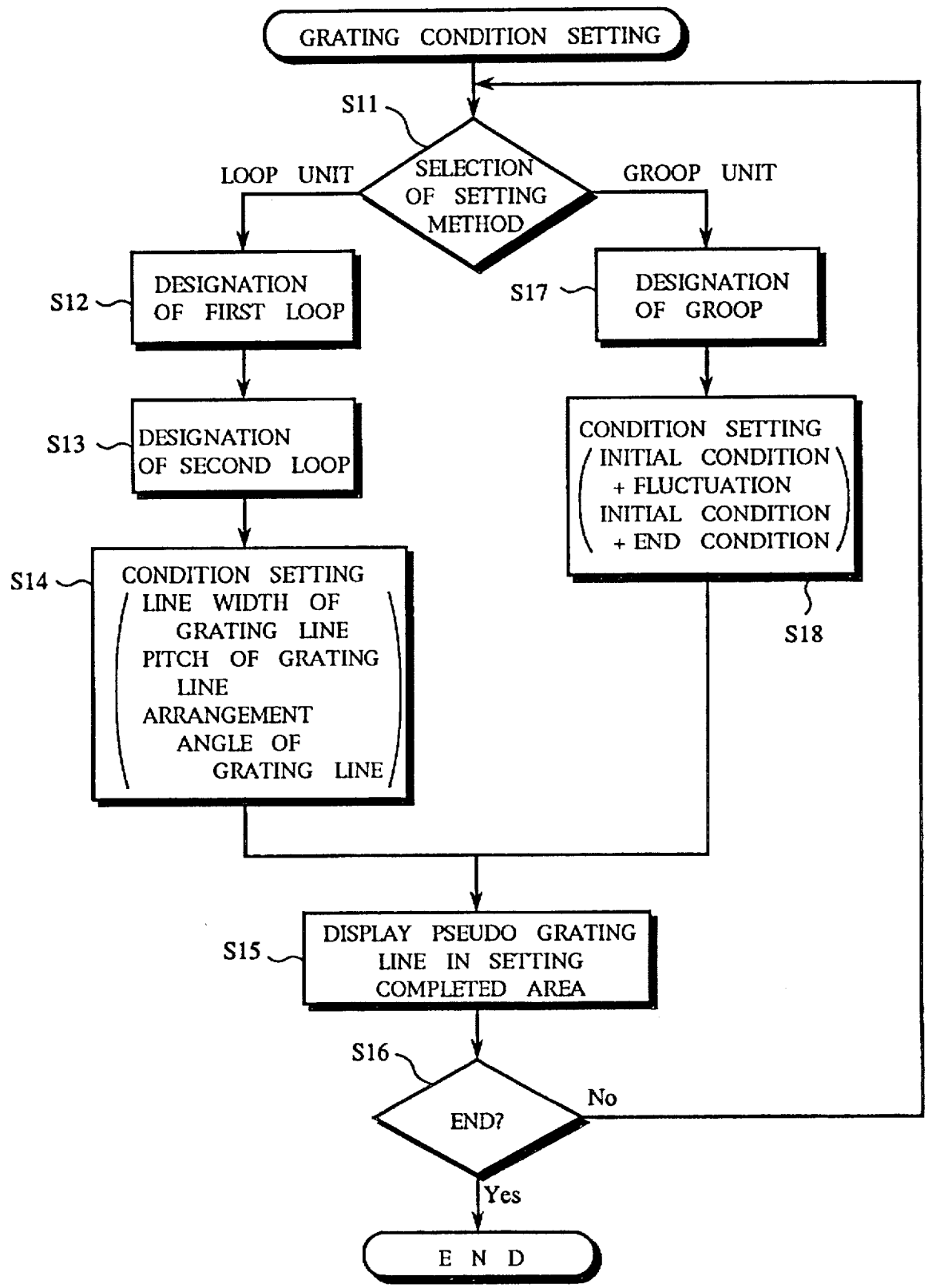
FIG. 46 is a flowchart for explaining the process procedure by a grating condition setting section 52 in the apparatus shown in FIG. 43.
Figure 47:
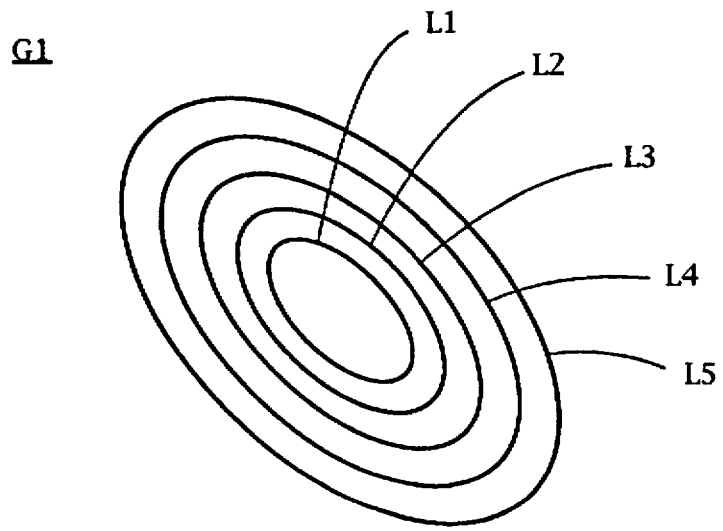
FIG. 47 is a partially enlarged view of the picture pattern shown in FIG. 45.

In the grating condition setting section 52, settings of grating conditions are carried out with respect to the respective fourteen closed areas constituting the picture pattern shown in FIG. 45. This setting procedure will now be explained in accordance with the flowchart of FIG. 46. In the apparatus of this embodiment, two kinds of methods are prepared for setting the grating condition. The first method is setting of loop unit (one closed area unit), and the second method is setting of group unit (plural closed area unit). Initially, at step S11, an operator carries out selection of setting method. For example, when the first method is selected, a first loop is designated at step S12 and a second loop is designated at step S13. In more practical sense, in the case where setting of loop unit is carried out with respect to group G1, adjacent two loops of the five loops L1 to L5 are designated as shown in FIG. 47. For example, when, in FIG. 47, the loops L3 and L4 are respectively designated as the first and the second loops, a closed area between the two loops is selected as an area to be set.

In the apparatus of this embodiment, the grating condition setting section 52 includes a color display unit, and this color display unit displays a picture pattern as shown in FIG. 45 in order to set the grating conditions. The operator can make an input to designate a specific loop by using an input equipment such as a mouse or a keyboard, etc. while looking at this display. Further, in this apparatus, every time the operator carries out a loop designation, only the designated loop is displayed in a manner such that color is changed. For example, in the case where the loops L3, L4 are designated, colors for displaying these two loops change. Thus, the operator can visually recognize which loop is designated at present.

Figure 48:
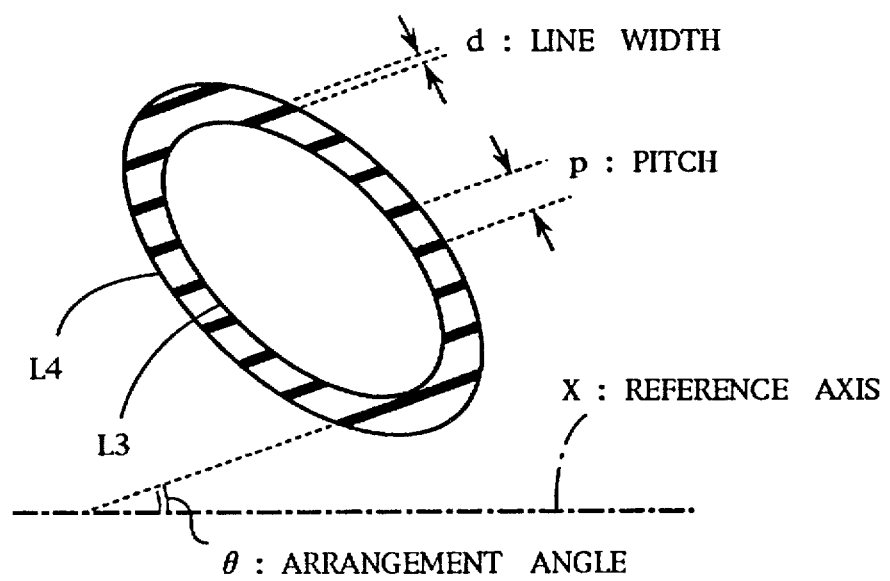
FIG. 48 is a view showing a grating condition defined in one closed area of the picture pattern shown in FIG. 47.

When a specific closed area is designated by the loop designation, condition setting for the designated specific closed area is carried out at step S14. In more practical sense, a line width, a pitch and an arrangement angle of grating lines to be generated within that closed area are inputted. For example, if grating lines as shown in FIG. 48 are to be generated within the closed area encompassed by the loops L3, L4, the operator inputs an instruction for designating line width d, pitch p and arrangement angle θ (angle when X-axis is caused to be reference axis in this example). If line width d or pitch p is always fixed to a predetermined value, it is sufficient to input an instruction for designating only the arrangement angle θ. The line width d and the pitch p are parameters for determining color of light observed from the diffraction grating, and the arrangement angle θ is a parameter for determining direction in which light is observed.

Figures 49, 50, 51:
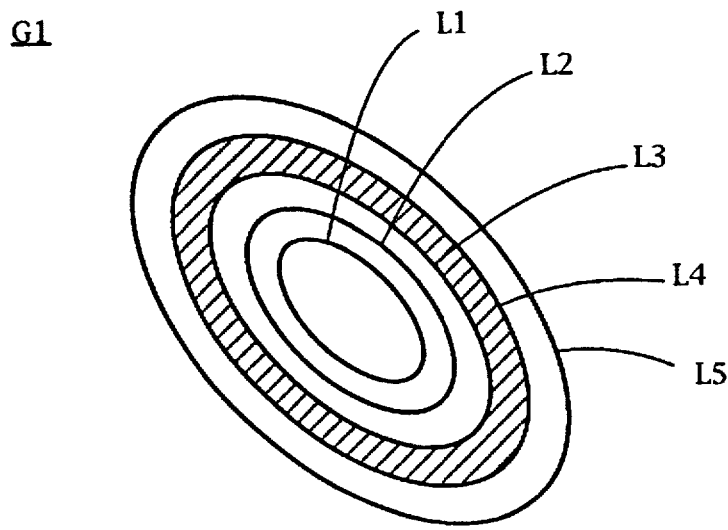
FIG. 49 is a view showing an example of a pseudo grating line display process at step S15 in the flowchart shown in FIG. 46.
FIG. 50 is a view showing an example of a condition setting process at step S18 in the flowchart shown in FIG. 46.
FIG. 51 is a view showing another example of a condition setting process at step S18 in the flowchart shown in FIG. 46.

Subsequently, at step S15, the grating condition setting section 52 displays pseudo grating lines in the area where the condition setting is completed. For example, when the condition setting with respect to the closed area encompassed by the loops L3, L4 is completed as shown in FIG. 48, pseudo grating lines are displayed within the closed area on the display unit as shown in FIG. 49. Since line width d and pitch p of actual grating lines are values of about 1 μm, it is impossible to display the actual grating lines on the display screen by any means by resolution of the display unit. In view of this, an approach is employed such that pseudo grating lines are obtained by thinning a number of the actual grating lines and enlarging line width d and pitch p so that they are equal to values several times greater than the actual grating lines, and these pseudo grating lines are displayed at an arrangement angle θ (which can be displayed as it is). The operator looks at this display, thereby making it possible to recognize the closed area where the condition setting has been completed, and to recognize the arrangement angle θ with respect to that closed area. If a function to alter magnification of display is provided, it is possible to display the actual grating lines with a size corresponding to the actual size on a sufficiently enlarged screen. Finally, the process returns to the procedure of step S11 via step S16. If such a procedure is repeatedly carried out, it is possible to set a grating condition for every respective closed area.

It is to be noted that designation of two loops at steps S12, S13 is not necessarily required. For example, when the closed area inside the loop L1 of FIG. 47 is the object area where the condition setting made, this object area can be specified only by designating the loop L1 at step S12. Alternatively, if a loop designated as the first loop last time is automatically dealt as the second loop next time, it is sufficient to newly designate the first loop every time. Such designation method can be suitably changed by taking operability into consideration.

On the other hand, at step S11, when an alternative selection for a designation of group unit is made, collective designation of a plurality of closed areas can be made. Initially, at step S17, a designation of group is carried out. Here, it is assumed that the group G1 in the picture pattern shown in FIG. 45 is designated. Subsequently, the condition setting is carried out at step S18. At this time, condition settings with respect to the five closed areas I to V formed by the loops L1 to L5 are collectively carried out. It is now assumed that an attempt is made to carry out, e.g., the condition setting as in the Table shown in FIG. 50. In this condition setting, line widths take a fixed value of 0.6 μm in all closed areas, and pitches also take a fixed value of 1.2 μm. It should be noted that the arrangement angle is 0° in the closed area I (internal area of the loop L1), increases by 10° according as the arrangement position shifts to the outside closed area, and takes a value of 40° in the closed area V (the outermost area encompassed by the loops L4, L5).

In the case where such a regular condition setting is carried out, a condition setting of group unit is convenient. As the condition setting method of group unit, two kinds of way are prepared in this embodiment. The first way is the way of designating an initial condition and a change. In the case of the example shown in FIG. 50, it is sufficient to designate 0° as an initial condition of the arrangement angle with respect to the closed area I, and to designate +10° as a change. The second way is the way of designating an initial condition and an end condition. In the case of the example shown in FIG. 50, it is sufficient to designate 0° as an initial condition of the arrangement angle with respect to the closed area I, and to designate 40° as an end condition of the arrangement angle with respect to the closed area V. With respect to the closed areas II to IV between these areas, setting of the arrangement angle is automatically carried out by linear interpolation. Moreover, in addition to the way of designating an initial condition and an end condition, another way of designating an intermediate condition may be employed. For example, in the case where the closed areas I to IX are continuously arranged as shown in FIG. 51, an approach is employed to designate −30° as an initial condition of the arrangement angle with respect to the closed area I and to designate the same −30° as an end condition of the arrangement angle with respect to the closed area IX, and to further designate 30° as an intermediate condition of the arrangement angle with respect to the closed area V. According to this way, respectively linearly interpolate are made for the areas between the closed areas I to V and the areas between the closed areas V to IX, to make it possible to automatically carry out setting of arrangement angles with respect to all the closed areas.

Thus, the operator continues work for setting grating conditions until pseudo grating lines are displayed in all the closed areas while looking at the respective closed areas of the picture pattern displayed on the display unit. If all the grating conditions are set, these conditions thus set are outputted from the grating condition setting section 52 as a grating condition data Q. In the apparatus of this embodiment, a contour line data C outputted from the contour line data preparation section 51 and a grating condition data Q outputted from the grating condition setting section 52 are both preserved into a floppy disk in the form of file.

When the contour line data C and the grating condition data Q are prepared in the file form into the floppy disk in this way, these data are inputted to the grating data preparation section 53. The grating data preparation section 53 prepares a grating pattern on the basis of these data to output it in the form of a grating data D. An example of an actual technique for preparing a grating pattern by the grating data preparation section 53 will now be explained. Here, for convenience of explanation, the process for preparing a grating pattern with respect to the closed area encompassed by the loop L1 of the picture pattern shown in FIG. 47 is taken as an example. In accordance with the fundamental procedure of this process, parallel lines are generated at a pitch p and an arrangement angle θ based on the grating condition data Q. Then intersecting points of the parallel lines and the loop L1 (contour line of the closed area) are determined to define line segments having these intersecting points as both end points. Finally a thickening process is carried out to allow the line segments to have line width d based on the grating condition data Q.

Figure 52:
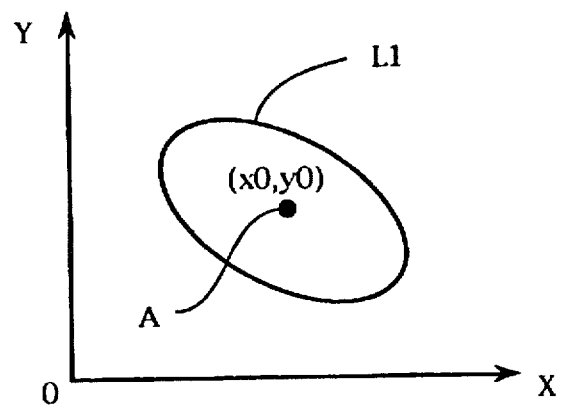
FIG. 52 is a view showing a center point determination process by grating data preparation section 53 in the apparatus shown in FIG. 43.

In this embodiment, two kinds of different process are carried out in dependency upon magnitude of the arrangement angle θ. Initially, in the case where $-45° \leq \theta \leq 45°$, parallel lines are generated in a manner described below. Namely, as shown in FIG. 52, coordinate values (x0, y0) of the center point A with respect to an object closed area is determined by calculation. As previously described, in this embodiment, the contour line data is all composed of vector data by linear approximation, and the loop L1 shown in FIG. 52 is represented by polygon in actual in place of ellipse. In view of this, it is sufficient to employ a method of calculating a gravity center position of respective vertices constituting this polygon to obtain coordinate values (x0, y0) of the center point A. Then, a reference linear line passing through the center point A (x0, y0) and having the arrangement angle θ in which gradient is set as the grating condition is determined. After that, a plurality of linear lines indicated by the following equation are determined with the reference linear line being as reference:

$$y = \tan \theta (x - x0) + y0 + dy \cdot n$$

$$dy = p/\cos \theta$$

Figure 53:
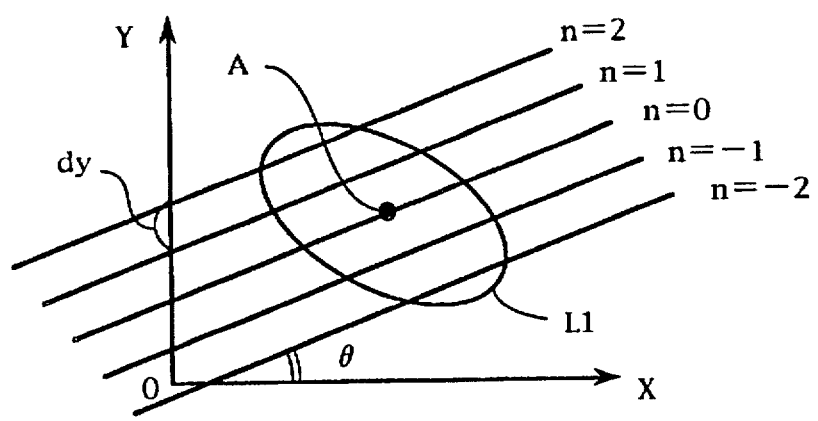
FIG. 53 is a view showing a parallel line generation process by grating data preparation section 53 in the apparatus shown in FIG. 43.

In the above equation, p is a pitch set as the grating condition and n is an integer which takes 0, ±1, ±2, .... As a result, a plurality of parallel lines as shown in FIG. 53 are determined. The line of n=0 is a reference linear line which passes through the center point A, and a plurality of linear lines intersecting with the loop L1 are determined at the both sides. Linear lines which do not intersect with the loop L1 are unnecessary.

Subsequently, intersecting points of these parallel lines and the loop L1 are determined to define line segments having the intersecting points as both the end points. For example, with respect to the linear line corresponding to n=0, two intersecting points A1(x1, y1), A2(x2, y2) are determined as shown in FIG. 12. Thus, a line segment m having these two points as both the end points can be defined.

Figure 54:
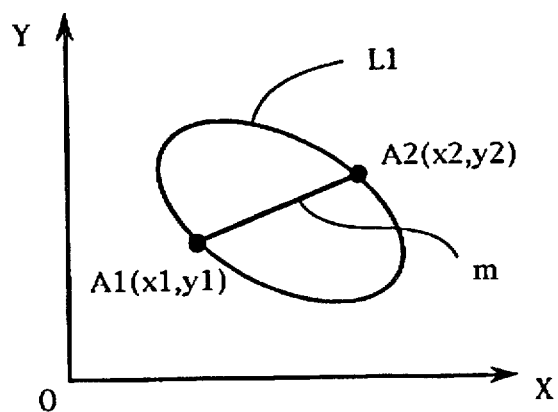
FIG. 54 is a view showing a line segment determination process based on the parallel lines shown in FIG. 53.

Then, thickening process for allowing this line segment m to have a predetermined line width d set as the grating condition is carried out. This thickening process is a process for giving width to a geometrical line segment having no element of width, and is, from an actual point of view, a process for replacing a line segment by an elongated square. Particularly, a method of replacing a line segment by an elongated parallelogram will now be described. Moreover, for simplifying operation, the case where a line width d=p/2 (p is a pitch) is taken as an example. Let now consider the case where the line segment m is replaced by an elongated parallelogram. The line segment m having both end points A1(x1, y1), A2(x2, y2) is defined as shown in FIG. 54. In this case, four vertices described below are obtained by calculation:

(X1, Y1)=(x1, y1+dy/4)

(X2, Y2)=(x1, y1−dy/4)

(X3, Y3)=(x2, y2−dy/4)

(X4, Y4)=(x2, y2+dy/4)

Figure 55:
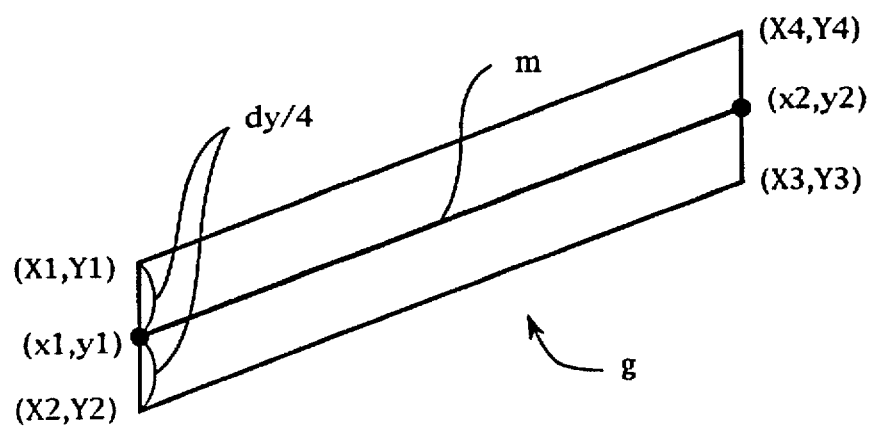
FIG. 55 is a view showing thickening process by grating data preparation section 53 in the apparatus shown in FIG. 43.
Figure 56:
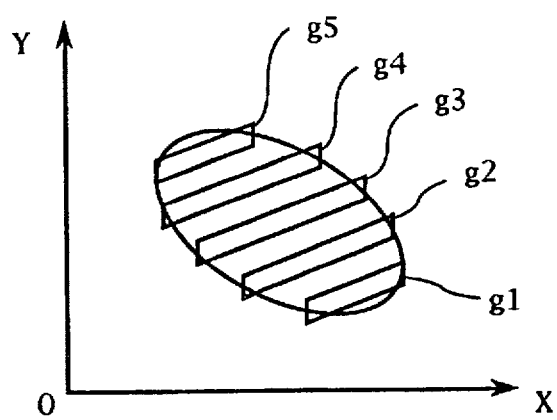
FIG. 56 is a view showing the state where the thickening process has been completed with respect to respective line segments obtained on the basis of the parallel lines shown in FIG. 53.

As a result, a parallelogram as shown in FIG. 55 is determined by the four vertices. In this parallelogram, short sides are both in parallel to Y-axis. In the case where the five parallel lines in total are determined as shown in FIG. 53, the five parallelograms g1 to g5 in which short sides are both in parallel to Y-axis are obtained. It is to be noted that ratio between a short side and a long side of each parallelogram is not so great in the figures, but it is general from actual point of view that the short side has a length of the order of 1 μm and the long side has a length of the order of 1 mm. Accordingly, these parallelograms are a very elongated parallelogram which can be regarded as a line segment when taking a broad view.

On the other hand, in the case where 45°<θ<90°, or −90°<θ<−45°, parallel lines are generated in a manner described below. Initially, similarly to the previously described case, coordinate values (x0, y0) at the center point A as shown in FIG. 52 are determined by calculation. Then, a reference linear line passing through the center point A (x0, y0) and having the arrangement angle θ in which gradient is set as the grating condition is determined. After that, a plurality of linear lines indicated by the following equation are determined with the reference linear line being as reference:

x=tanφ(y−y0)+x0+dx·n dx=p/cosφ

Figure 57:
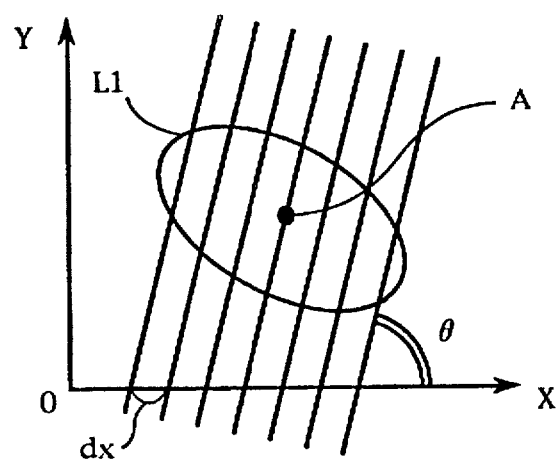
FIG. 57 is a view showing another parallel line generation process by grating data preparation section 53 in the apparatus shown in FIG. 43.

In the above equation, φ=90°−θ (in the case where 45°<θ<90°) and φ=−(90°+θ) (in the case where −90°<θ<−45°). As a result, a plurality of parallel lines as shown in FIG. 57 are determined.

Figure 58:
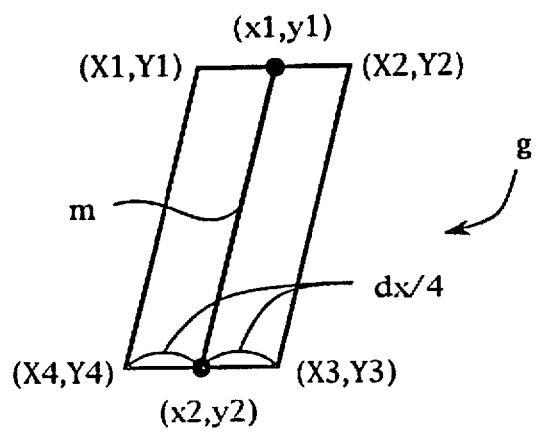
FIG. 58 is a view showing a further thickening process by grating data preparation section 53 in the apparatus shown in FIG. 43.

Subsequently, intersecting points of these parallel lines and the loop L1 are determined to define line segments m having the intersecting points as both the end points. Then a thickening process is carried out. In the example here, as shown in FIG. 58, a line segment m having both end points (x1, y1), (x2, y2) are defined and four vertices described below are determined with respect to this line segment m. Finally the line segment m is replaced by an elongated parallelogram having these four vertices:

(X1, Y1)=(x1−dx/4, y1)

(X2, Y2)=(x1+dx/4, y1)

(X3, Y3)=(x2+dx/4, y2)

(X4, Y4)=(x2−dx/4, y2)

Figure 59:
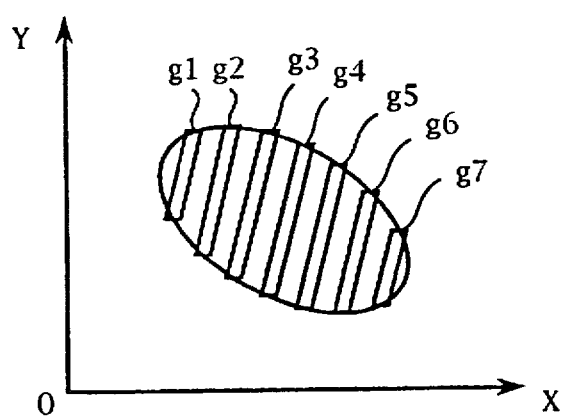
FIG. 59 is a view showing the state where the thickening process has been completed with respect to respective line segments obtained on the basis of parallel lines shown in FIG. 57.

In this parallelogram, short sides are both in parallel to the X-axis. In the case where the seven parallel lines in total are determined as shown in FIG. 57, the seven parallelograms g1 to g7 in which respective short sides are all in parallel to X-axis are obtained as shown in FIG. 59. It is to be noted that these parallelograms are a very elongated parallelogram which can be regarded as a line segment when taking a broader view.

Figure 60:
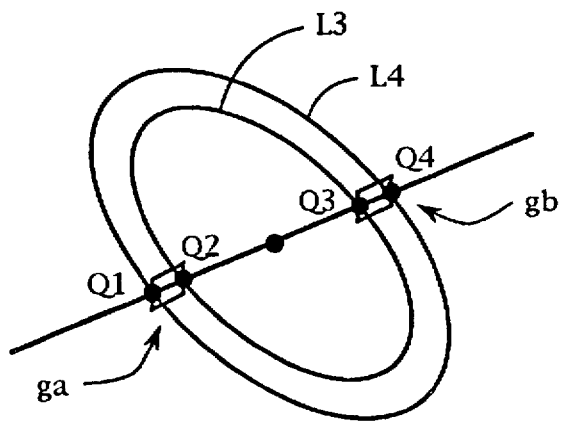
FIG. 60 is a view showing a grating data preparation process with respect to a closed area encompassed by two loops.

The method of preparing a grating pattern with respect to the closed area encompassed by the loop L1 has been described above. Also with respect to a closed area encompassed by two loops, a grating pattern can be prepared by a method substantially similar thereto. Since, as shown in FIG. 60, for example, four intersecting points Q1 to Q4 are obtained with respect to a single linear line in connection with the closed area encompassed by the loops L3, L4, it is sufficient to prepare a parallelogram ga by thickening process for the line segment Q1Q2, and to prepare a parallelogram gb by thickening process for the line segment Q3Q4. When a grating pattern with respect to all the closed areas can be prepared by parallelograms, this grating pattern is outputted as a grating data D. The original block preparation section 54 forms a physical grating pattern on the basis of the grating data D to prepare a diffraction grating original block H.

Eventually, with the above-described method, respective grating lines are all constituted with very elongated parallelograms. In addition, two kinds of parallelograms are used in dependency upon whether or not arrangement angle θ is beyond ±45°. Namely, the first parallelogram is prepared in such a manner that the short side is in parallel to the Y-axis, and the second parallelogram is prepared in such a manner that the short side is in parallel to the X-axis. The reason why a parallelogram such that the short sides are in parallel to either coordinate axis is prepared is that convenience of the original block preparation process by the original block preparation section 54 is taken into consideration. As previously described, in this embodiment, the electron beam picture drawing apparatus for preparing photo-mask is used as the original block preparation section 54. The reason thereof is as follows. Namely, this picture drawing apparatus can draw a parallelogram such that opposite pair of sides are in parallel to either coordinate axis far efficiently than it draws an arbitrary square. This is because a picture is drawn while scanning spot of an electron beam in respective coordinate axes. Accordingly, if a parallelogram is prepared in advance by method as described above, very efficient picture drawing can be made.

While the invention according to the second approach has been described in accordance with the embodiments shown, this invention is not limited to those embodiments, but may be carried out in various forms in addition to the above. For example, in the above-described embodiment, very elongated parallelogram is used as a grating line. The reason why such a parallelogram is employed is to improve picture drawing efficiency in the electron beam picture drawing apparatus for preparing photo-mask. For this reason, this is not essential matter in this invention. Accordingly, a very elongated rectangle may be used as a grating line. In addition, while the contour line data preparation section 51, the grating condition setting section 52, and the grating data preparation section 53 are respectively illustrated as separate components in the block diagram shown in FIG. 46, they may be constituted with computer system which is exactly the same as the above from a viewpoint of hardware.

What is claimed is:

1. A diffraction grating recording medium in which plural motifs are represented by diffraction gratings, comprising:

a plurality of pixel patterns arranged on a planar surface of a medium, each of said pixel patterns having grating lines of a predetermined width arranged within a predetermined closed area at a predetermined pitch and a predetermined angle with respect to a reference axis defined on said planar surface, at least one of three parameters of line width, pitch and angle of said pixel patterns being different from the others, each of said pixel patterns belonging to one of a plurality of groups, respectively, and pixel patterns belonging to the same group having grating lines with different angles within a given angle range relative to each other, such that at least one motif is represented with tones by the pixel patterns belonging to the same group thereof, and wherein given angle ranges for the respective groups are set so that a difference between boundary angle values of adjacent ranges is greater than a predetermined minimum value, and wherein pixel patterns belonging to different groups represent different motifs respectively thereby to represent plural motifs on the same planar surface in an overlapping manner.

2. A diffraction grating recording medium as set forth in claim 1, wherein a motif is divided into a plurality of areas and the same pixel patterns having the same parameters are arranged within the same area.

3. A diffraction grating recording medium as set forth in claim 1, wherein unit sub-pixel arrangements comprised of sub-pixels arranged in a matrix of 2 rows by 2 columns are arranged lengthwise and breadthwise; pixel patterns for representing a first motif are arranged at left upper sub-pixels and right lower sub-pixels in the respective unit sub-pixel arrangements; and pixel patterns for representing a second motif are arranged at left lower sub-pixels and right upper sub-pixels in the respective unit sub-pixel arrangements, thus to represent two motifs in the same plane in an overlapping manner.

4. A diffraction grating recording medium as set forth in claim 1, wherein unit sub-pixel arrangements comprised of sub-pixels arranged in a matrix of 2 rows by 2 columns are arranged lengthwise and breadthwise; pixel patterns for representing a first motif are arranged at left upper sub-pixels in the respective unit sub-pixel arrangements; pixel patterns for representing a second motif are arranged at right upper sub-pixels in the respective unit sub-pixel arrangements; pixel patterns for representing a third motif are arranged at left lower sub-pixels in the respective unit sub-pixel arrangements; and pixel patterns for representing a fourth motif are arranged at right lower sub-pixels in the respective unit sub-pixel arrangements, thus to represent four motifs in the same plane in an overlapping manner.

5. A diffraction grating recording medium as set forth in claim 1, wherein unit sub-pixel arrangements comprised of sub-pixels arranged in a matrix of 3 rows by 3 columns are arranged lengthwise and breadthwise; pixel patterns for representing a first motif are arranged at sub-pixels of a first row and a first column, sub-pixels of a second row and a second column, and sub-pixels of a third row and a third column in the respective unit sub-pixel arrangements; pixel patterns for representing a second motif are arranged at sub-pixels of the first row and the second column, sub-pixels of the second row and the third column, and sub-pixels of the third row and the first column in the respective unit sub-pixel arrangements; and pixel patterns for representing a third motif are arranged at sub-pixels of the first row and the third column, sub-pixels of the second row and the first column, and sub-pixels of the third row and the second column in the respective unit sub-pixel arrangements, thus to represent three motifs in the same plane in an overlapping manner.

6. A diffraction grating recording medium as set forth in claim 1, wherein unit sub-pixel arrangements comprised of sub-pixels arranged in a matrix of 3 rows by 3 columns are arranged lengthwise and breadthwise; pixel patterns for representing a first motif are arranged at sub-pixels of a first row and a first column, sub-pixels of a second row and a third column, and sub-pixels of a third row and a second column in the respective unit sub-pixel arrangements; pixel patterns for representing a second motif are arranged at sub-pixels of the first row and the second column, sub-pixels of the second row and the first column, and sub-pixels of the third row and the third column in the respective unit sub-pixel arrangements; and pixel patterns for representing a third motif are arranged at sub-pixels of the first row and the third column, sub-pixels of the second row and the second column, and sub-pixels of the third row and the first column in the respective unit sub-pixel arrangements, thus to represent three motifs in the same plane in an overlapping manner.

7. A diffraction grating recording medium as set forth in claim 1, wherein a first motif is represented by pixel patterns belonging to a first group and a second motif is represented by pixel patterns belonging to a second group, wherein the pixel patterns belonging to said first group have grating lines at different angles within a first said angle range and pixel patterns belonging to said second group have grating lines at different angles within a second said angle range, and wherein said first angle range and said second angle range are such that visual discrimination between said first motif and said second motif is obtained.

8. A diffraction grating recording medium as claimed in claim 1, wherein said minimum value of the difference between boundary angle values of adjacent ranges is 30°.

* * * * *